United States Patent
Walwadkar

(10) Patent No.: US 11,057,478 B2
(45) Date of Patent: Jul. 6, 2021

(54) HYBRID CLUSTER ARCHITECTURE FOR REVERSE PROXIES

(71) Applicant: Fortinet, Inc., Sunnyvale, CA (US)

(72) Inventor: Radhesh Ramakant Walwadkar, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 129 days.

(21) Appl. No.: 16/420,303

(22) Filed: May 23, 2019

(65) Prior Publication Data

US 2020/0374353 A1 Nov. 26, 2020

(51) Int. Cl.
| | | |
|---|---|---|
| H04L 29/08 | (2006.01) | |
| G06F 11/20 | (2006.01) | |
| H04L 29/06 | (2006.01) | |
| H04L 12/24 | (2006.01) | |

(52) U.S. Cl.
CPC ........ *H04L 67/148* (2013.01); *G06F 11/2028* (2013.01); *H04L 41/0668* (2013.01); *H04L 63/0281* (2013.01); *H04L 63/1408* (2013.01); *G06F 2201/805* (2013.01)

(58) Field of Classification Search
CPC ............. G06F 11/1425; G06F 11/2023; G06F 11/2025; G06F 11/2028; G06F 11/2041; G06F 11/2097; G06F 9/5083; H04L 67/1031; H04L 67/1034; H04L 63/0281; H04L 41/0668; H04L 69/40
See application file for complete search history.

(56) References Cited

U.S. PATENT DOCUMENTS

| | | | | |
|---|---|---|---|---|
| 5,938,732 | A * | 8/1999 | Lim | G06F 9/5061 |
| | | | | 709/226 |
| 6,880,156 | B1 * | 4/2005 | Landherr | G06F 9/5083 |
| | | | | 709/229 |
| 7,881,208 | B1 * | 2/2011 | Nosella | H04L 61/103 |
| | | | | 370/242 |
| 10,516,649 | B1 * | 12/2019 | Jain | H04L 67/10 |

(Continued)

OTHER PUBLICATIONS

Applebaum, Alex, "ScaleN: A Network Architect—Engineer's Unofficial Guide to ScaleN Clustering—Part 1", May 13, 2019, 48 pages.

(Continued)

*Primary Examiner* — Gabriel Chu
(74) *Attorney, Agent, or Firm* — Law Office of Dorian Cartwright; Dorian Cartwright

(57) ABSTRACT

Systems and methods for an improved HA cluster architecture that provides for seamless failover while also maintaining full processing capacity are provided. According to one embodiment, each member of a hybrid HA cluster of reverse proxy network security devices is configured to operate in an active mode or in a backup mode. A primary member of a set of active members of the cluster receives and processes network traffic. The cluster detects existence of a failure scenario of multiple potential failure scenarios involving an active member, including (i) failure of the primary member; and (ii) failure of a non-primary member. Responsive to detecting the existence of the failure scenario, seamlessly failing over from the failed active member to a backup member of a set of backup members of the cluster by causing the backup member to join the set of active members by placing it in the active mode.

17 Claims, 18 Drawing Sheets

(56) References Cited

U.S. PATENT DOCUMENTS

| | | | | |
|---|---|---|---|---|
| 2004/0268175 | A1* | 12/2004 | Koch | H04L 69/161 714/4.11 |
| 2005/0138517 | A1* | 6/2005 | Monitzer | G06F 11/2025 714/746 |
| 2005/0160133 | A1* | 7/2005 | Greenlee | H04L 67/1023 709/200 |
| 2006/0080569 | A1* | 4/2006 | Sciacca | G06F 11/3433 714/4.1 |
| 2007/0180314 | A1* | 8/2007 | Kawashima | G06F 11/3433 714/15 |
| 2008/0120177 | A1* | 5/2008 | Moscirella | G06Q 30/0209 705/14.12 |
| 2008/0285438 | A1* | 11/2008 | Marathe | H04M 7/125 370/220 |
| 2010/0162036 | A1* | 6/2010 | Linden | G06F 11/181 714/4.11 |
| 2010/0325473 | A1* | 12/2010 | Agneeswaran | G06F 11/2041 714/4.1 |
| 2015/0188753 | A1* | 7/2015 | Anumala | H04L 12/4675 370/225 |

OTHER PUBLICATIONS

"High Availability", Barracuda Web Application Firewall, https://campus.barracuda.com/doc/4259911, 4 pages.

\* cited by examiner

HYBRID CLUSTER ARCHITECTURE FOR REVERSE PROXIES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security and HA clusters. In particular, embodiments of the present invention relate to an improved HA cluster architecture that provides for seamless failover while also maintaining full processing capacity.

Description of the Related Art

In network architecture, if a network device running a particular application crashes, the application may not be available until the crashed device is fixed. High-availability (HA) systems provide a remedy to such situations by detecting hardware crashes or failures, and immediately restarting the application on another device, for example. HA systems include clusters (HA clusters) that represent groups of computing devices, network devices, server arrays, and the like to support web applications and provide continued service even when one or more components (e.g., members of an HA cluster) fail.

Traditional HA architectures ((Active-Active (A-A) or Active-Passive (A-P)) in which a backup (active or passive) member in an HA cluster takes over for a failed primary active member in the HA cluster is designed to avoid loss of service by reducing or managing failures and minimizing downtime, but results in reduced processing capacity. Today's Cloud Service Providers (CSPs) cannot rely on these simple traditional HA architectures as they desire to maintain full processing capacity at all times. As such, various failover models have been proposed that allow full processing capacity to be maintained by failing over, for example, from a production chassis or equipment rack to a backup chassis or equipment rack. However, as described below with reference to FIG. 1 and FIG. 2, failover flexibility, efficiency and seamlessness, among other issues, are introduced by these proposed solutions.

An example of a conventional HA system that performs a complete failover from one chassis-based system to another is described with reference to FIG. 1. In the context of FIG. 1, which is used for web application firewall devices, two different equipment racks (not shown) are maintained in which a production chassis 102 with active devices 106-1 and 106-2 and a failover chassis 104 with corresponding backup devices 108-1 and 108-2 are mounted. A sync-failover device group includes two dual-slot, four core guests as members. Blade 106-1 and Blade 106-2 are active in chassis 102, blade 108-1 and blade 108-2 operate in passive mode in chassis 104 and slots 110-2, 110-2, 112-1 and 112-2 are empty. This failover approach involves the use of two different Virtual Internet Protocol addresses (VIPs)—one for chassis 102 and one for chassis 104. When a failure of one of active devices 204-1 or 204-2 is detected a complete failover from the active chassis (i.e., chassis 102) to the failover chassis (i.e., chassis 104) is performed. So, resources are not used efficiently as even though one of active devices 204-1 or 204-2 might remain operational, in order to maintain full processing capacity, the failover model requires performing a complete failover from the production rack to the backup rack. Also, unless a load balancer is logically interposed between the client device (not shown) and chassis 102 and 104, failover is not transparent/seamless to end users of the client devices as after the failover network traffic originating from the client devices must be directed to the VIP associated with chassis 104. Furthermore, as session information relating to network traffic currently being processed is not synchronized between the two guests in this failover model, failover from production chassis 102 to backup chassis 104 is not seamless as the session information will be lost.

Further, an A-A HA cluster with some devices being active and some devices being passive is not be permitted in some vendor implementations. For example, a typical A-A HA configuration may require all members of the cluster to be active. FIG. 2 illustrates an exemplary implementation in which active devices 204-1 and 204-2 are members of an active cluster 210 and passive devices 206-1 and 206-2 are members of a passive cluster 212 and a load balancer 202 directs network traffic (e.g., HTTP requests for content and/or application data associated with servers 212-1 or 212-2) as appropriate to a first VIP associated with active cluster 210 or a second VIP associated with passive cluster 212 via a switch 210 interconnecting devices 204-1, 204-2, 206-1 and 206-2. In addition to the limitations noted above in relation to the HA system of FIG. 1, in the context of the HA architecture of FIG. 2 load balancer 202 becomes a single point of failure. Furthermore, the capacity of load balancer 202 imposes a limit on the number of members that can be part of active cluster 210 and passive cluster 212. Moreover, when using Secure Sockets Layer (SSL), load balancer 202 must perform the initial SSL offload.

What CSPs need is an improved HA cluster architecture and an associated failover model that provides for seamless failover and maintains full processing capacity while also avoiding the various disadvantages noted above.

SUMMARY

Systems and methods are described for an improved HA cluster architecture that provides for seamless failover while also maintaining full processing capacity. According to one embodiment, each member of multiple members of a hybrid HA cluster of reverse proxy network security devices is configured to operate in an active mode or in a backup mode. A primary member of a set of active members of the hybrid HA cluster receives and processes network traffic. The hybrid HA cluster detects existence of a failure scenario of multiple potential failure scenarios involving an active member of the set of active members, including (i) failure of the primary member; and (ii) failure of a non-primary member of the set of active members. Responsive to detecting the existence of the failure scenario, seamlessly failing over from the failed active member to a backup member of a set of backup members of the hybrid HA cluster by causing the backup member to join the set of active members by placing it in the active mode.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
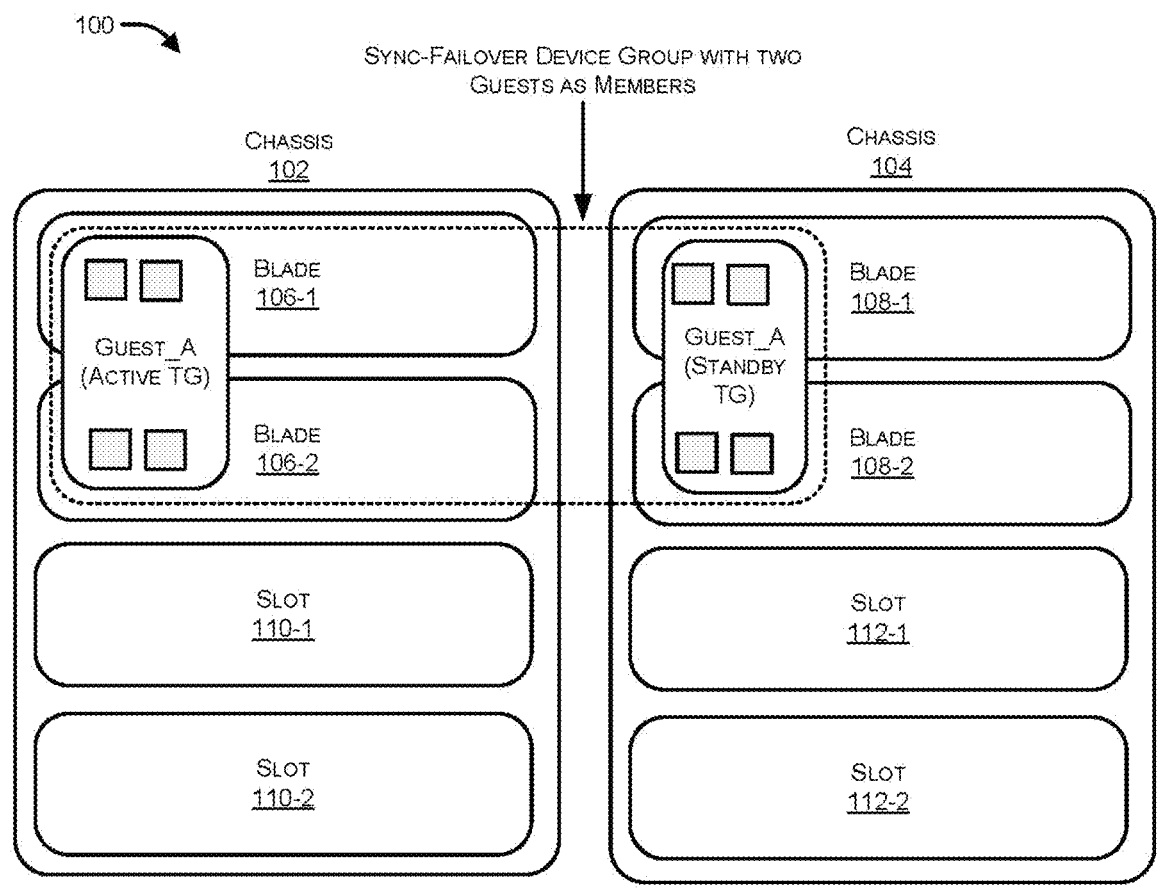
FIG. 1 illustrates a generalized view of a prior art architecture for a high-availability system.
Figure 2:
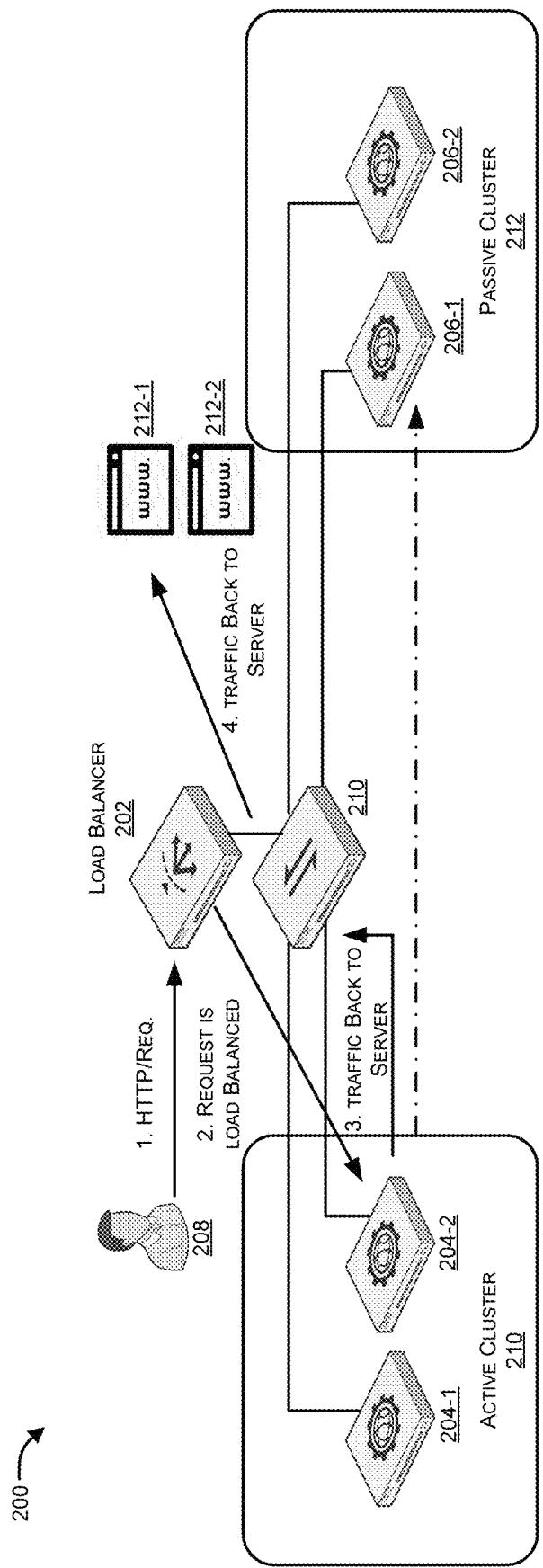
FIG. 2 illustrates another prior art architecture using an external load balancer for providing high-availability approach.

Systems and methods are described for an improved HA cluster architecture that provides for seamless failover while also maintaining full processing capacity. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "reverse proxy network security device" generally refers to a security device that operate in a manner similar to a reverse proxy (e.g., accept a request from a client, performs security screening on the request, forwards the request (if it passes the security screening) to a server that can fulfill it, optionally performs security screening on the response from the server and returns the server's response (if it passes the optional security screening) to the client). A current example of a reverse proxy network security device is a web application firewall.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for an improved HA cluster architecture that provides for seamless failover while also maintaining full processing capacity. According to one embodiment, each member of a plurality of members of a hybrid HA cluster of reverse proxy network security devices is configured to operate in an active mode or in a backup mode. Further, a primary member of the active members receives and processes network traffic. The hybrid HA cluster detects existence of a failure scenario of a plurality of failure scenarios involving an active member of the active members, the plurality of failure scenarios including (i) failure of the primary member; and (ii) failure of a non-primary member of the active members. Further, the hybrid HA cluster causes the backup member to join the active members by placing it in the active mode to seamlessly fail over from the active member to a backup member.

Embodiments of present disclosure and their advantages are best understood with reference to FIG. 3 to FIG. 10. FIGS. 3A-B illustrate an improved HA architecture in accordance with an embodiment of the present invention.

Figure 3A:
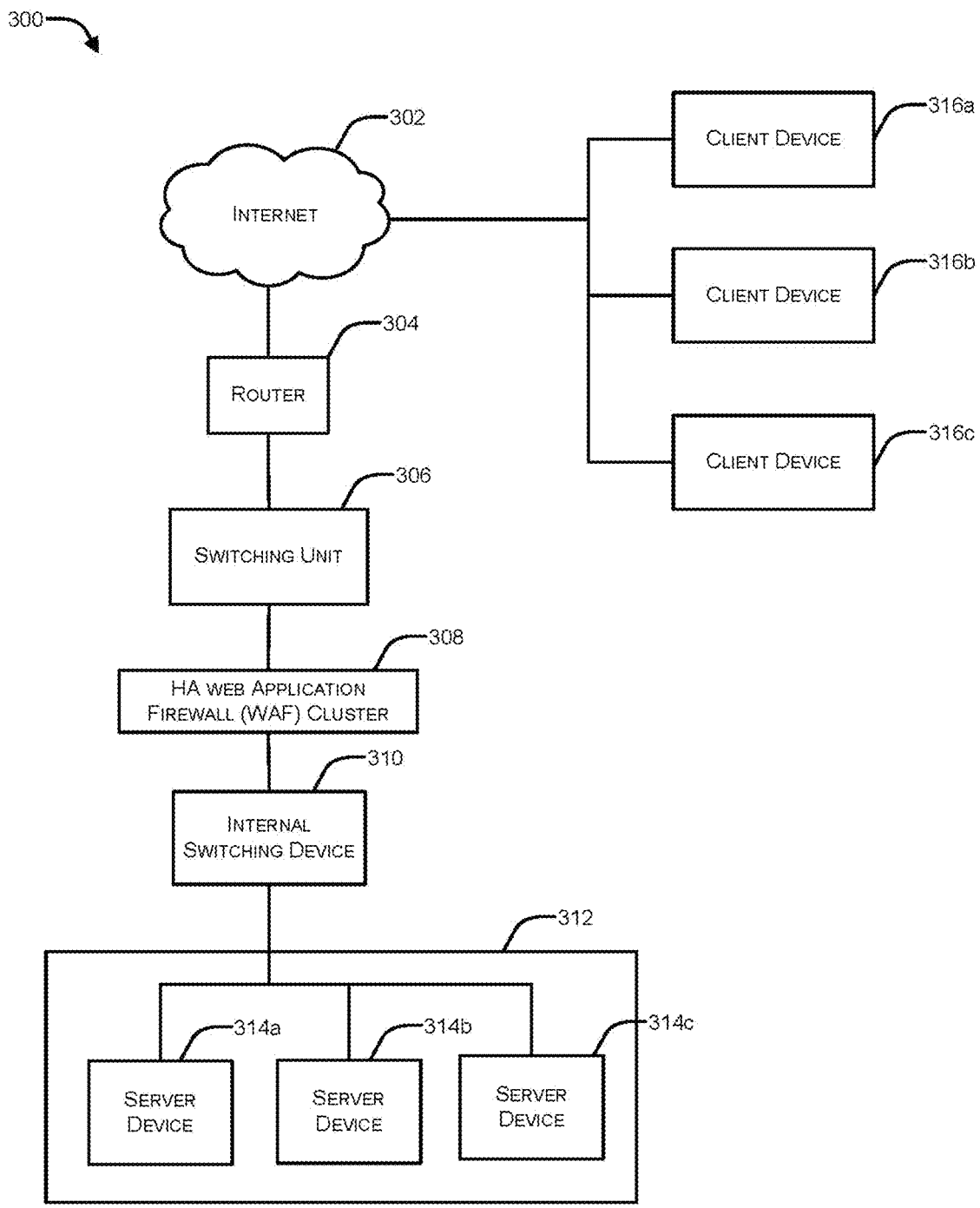
FIGS. 3A-B illustrate an improved HA architecture in accordance with an embodiment of the present invention.

FIG. 3A is a block diagram conceptually illustrating a simplified network architecture 300 in which embodiments of the present invention may be employed. Network 300 includes a private or public network, such as a local area network (LAN), wide area network (WAN) or Internet 302, a router 304, a switching unit 306, a HA Web Application firewall (WAF) cluster 308, an internal switching device 310, an internal network 312 (or server farm), and one or more external client devices, such as, client devices 316 a-c, hereinafter referred to as the one or more client devices 316. One or more client devices 316 are connected to switching unit 306 over Internet 302 through router 304. Examples of one or more client devices 316 include a desktop computer, a laptop, a notebook computer, a handheld device, such as, a mobile phone, a smart phone, a palm-top computer, Personal Digital Assistant (PDA), a navigational unit, and so forth without deviating from the scope of the invention. Further, internal network 312 includes one or more server devices, such as, server devices 314 *a-c*, hereinafter referred to as the one or more server devices 314.

In an embodiment, one or more server devices 314 are connected in a LAN. In another embodiment, one or more server devices 314 are connected in a wireless LAN (WLAN). It will be apparent to a person ordinarily skilled in the art that one or more server devices 314 may also be connected in other network configurations without deviating from the scope of the present invention. In an embodiment, one or more server devices 314 may be located at a datacenter (e.g., a facility where multiple computer systems and associated supporting systems, such as, telecommunications and storage systems are hosted). Further, the datacenter may include various backup power supplies, several data communication connectors, security systems and environmental controls, such as, air conditioning and fire suppression. The datacenter may occupy one room of a building, one or more floors, or may be an entire building. The one or more servers may be mounted in one or more rack cabinets. Although embodiments of the present disclosure are explained using a private cloud provider or a data center architecture as an example, those skilled in the art will appreciate that embodiments of the present disclosure can also be implemented by Managed Security Service Providers (MSSPs) where the web application(s) in the context of the example above would be represented by one or more security services performed on behalf of subscribers by the MSSPs.

In an embodiment, internal network 312 of one or more server devices 314 is connected to HA (WAF) cluster 308 through internal switching device 310. In operation, traffic from internal switching device 310 is sent to a HA (WAF) cluster 308, wherein HA (WAF) cluster 308 includes multiple active members and multiple passive members (as described further below with reference to FIG. 3B) and inspects HTTP traffic to/from web applications running on server devices 314*a-c* and filters, monitors and/or blocks the traffic to protect the web applications from an attack. In an embodiment, HA (WAF) cluster 308 is connected to an external switching unit 306, which in turn is connected to router 304 that controls all traffic entering and leaving HA (WAF) cluster 308. Router 304 is connected to Internet 102 to enable one or more client devices 316 to interact with or otherwise access the web applications via the Internet 302.

Figure 3B:
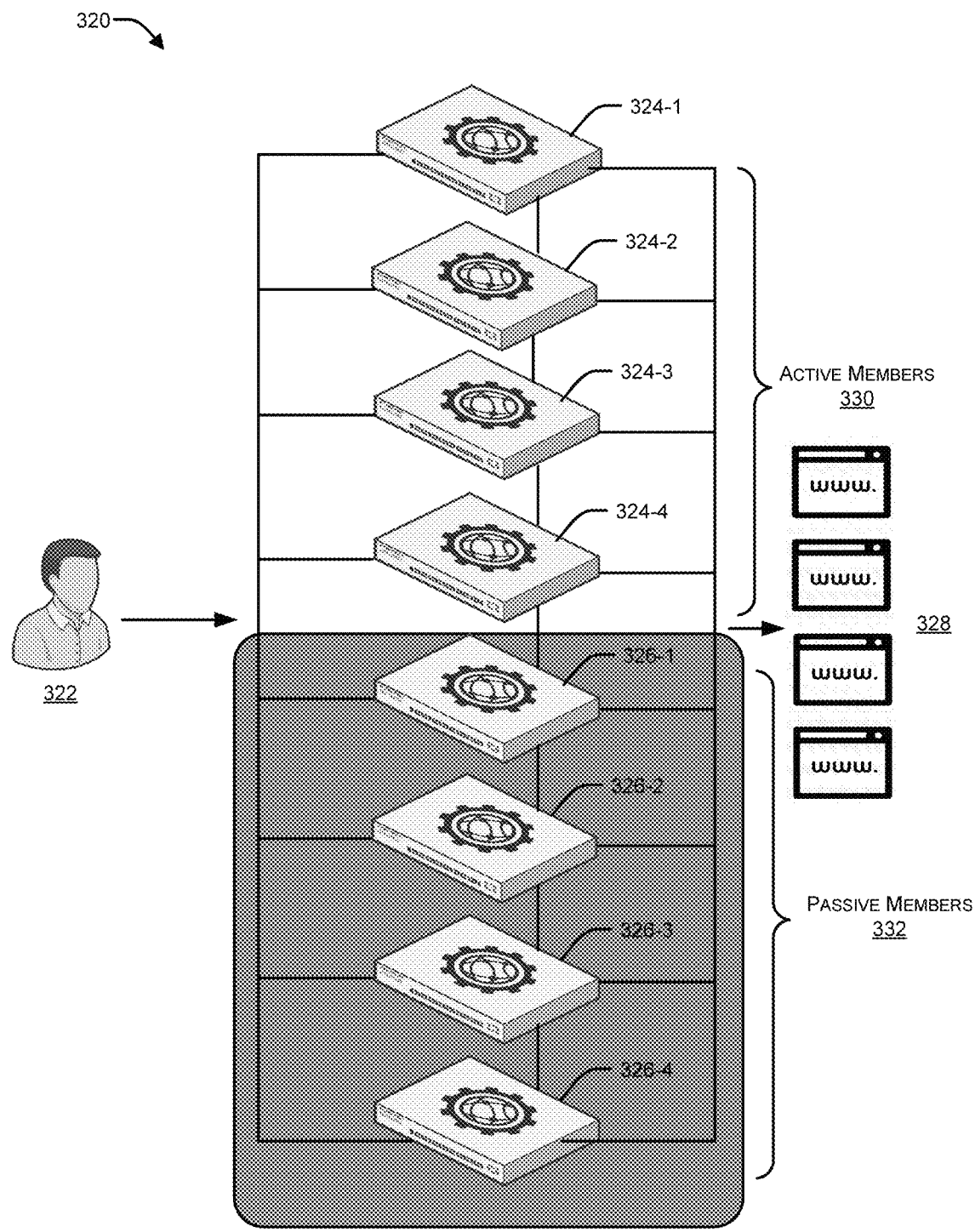

Referring now to FIG. 3B in view of FIG. 3A, HA (WAF) cluster 308 of WAF devices, which represent a non-limiting example of reverse proxy network security devices, includes multiple members, some of which are configured to operate in an active mode and some of which are configured to operate in a backup mode. For example, members 324-1, 324-2, 324-2 and 324-4, may be configured to operate in active mode and may be collectively represented by active members 330, while members 326-1, 326-2, 326-2 and 326-4, may be configured to operate in backup mode and may be collectively represented by passive members 332 (as backup members operate in passive mode during normal operation, terms passive members and backup members are used interchangeably, hereinafter).

Typically, an equal number of members would initially be configured to operate in the active mode (e.g., A-A) and in the backup mode. In order for one reverse proxy network security device of the hybrid HA cluster to take over network traffic processing on behalf of another, typically, the reverse proxy network security devices that are part of the hybrid HA cluster would all be similar equipment models from the same vendor and would support similar security functionality.

In one embodiment, members operating in the active mode are available to process network traffic. For example, the primary active member may process some portion of network traffic and distribute a remaining portion to one or more other active members for processing. Members operating in the backup mode do not process traffic, but rather receive session information regarding sessions being processed by the active members so that they are ready to be promoted to the active mode if and when needed, for example, responsive to a failure of an active member.

In an example, network administrator 322 may configure at least two members of HA (WAF) cluster 308 to operate in the active mode, and at least two members of HA (WAF) cluster 308 to operate in the backup mode. Further, the reverse proxy network security devices of HA (WAF) cluster 308 may include web application firewalls such that network traffic 328 includes HyperText Transfer Protocol (HTTP) traffic to or from web applications, e.g., provided by a CSP.

According to an embodiment, a primary member, say 324-1 of the active members 330 receives and processes network traffic 328. For example, the primary member may perform security screening including filtering, monitoring or blocking of HTTP traffic on at least part of network traffic 328 and offload a remaining portion of network traffic 328 to one or more other members of active members 330, say 324-2, 324-2 and 324-3. Primary member 321-1 further performs session synchronization by communicating session information associated with network traffic 328 with all other active members 324-2, 324-3, 324-4 and backup members 332.

According to an embodiment, HA (WAF) cluster 308 detects existence of a failure scenario involving an active member 324-1, 324-2, 324-2 or 324-3 of active members 330. The failure scenario may be one of multiple failure scenarios including (i) failure of the primary member 324-1; and (ii) failure of a non-primary member of the active members 324 say 324-2, 324-3 or 324-4. Those skilled in the art will appreciate that each member indicates its ongoing availability by transmitting heartbeat messages to all other members. Therefore, HA (WAF) cluster 308 may detect existence of the failure scenario involving an active member 324-1, 324-2, 324-3 or 324-4 based on observing a lack of a heartbeat message from a particular active member during a predefined time-period.

Further, in response to detection of the existence of the failure, HA (WAF) cluster 308 causes a backup member, say 326-1, of backup members 332 to join the active members 330 by placing backup member 326-1 in the active mode to seamlessly fail over from active member 324-1, 324-2, 324-3 or 324-4 to backup member 326-1. Backup member 326-1 may be selected based on its media access control (MAC) address, for example a backup member of backup members having the lowest MAC id may be selected and placed to operate in active mode. In alternative embodiments, additional priority information may be assigned to members by the network administrator and such additional priority information may also be taken into account in connection with selecting the next backup member to serve as an active member. In an embodiment, network traffic 328 is directed to a virtual Internet Protocol address (VIP) to facilitate seamless failover from active member 324-1, 324-

2, 324-3 or 324-4 to backup member 326-1, HA (WAF) cluster 308 selects backup member 326-1 from among backup members 332 to become one of active members 330.

In an embodiment, when the failure scenario represents the failure of primary member 324-1, HA (WAF) cluster 308, selects from a remaining set of active members 324-2, 324-3 or 324-4 a new primary member, say 324-2 that will serve as the new primary member. Also, the VIP is associated with the selected new primary member 324-2 so that subsequent network traffic 328 directed to the VIP may be received by the new primary member 324-2.

In an embodiment, the reverse proxy network security devices of HA (WAF) cluster 308 may be implemented in a form of a blade configured to be installed within a chassis-based system, where active members 330 are associated with a first chassis-based system and backup members 332 are associated with a second chassis-based system. Therefore, the failure scenarios may further include failure of the first chassis-based system containing active members 330.

In an embodiment, when the failure scenario represents the failure of the first chassis-based system, HA (WAF) cluster 308 cluster may select a backup member, say 326-1 that may serve as a primary member for the second chassis-based system. Further, the second chassis-based system may reconfigure backup members 332 to operate in the active mode. Also, HA (WAF) cluster 308 may associate the VIP formerly associated with primary member 324-1 with the new primary member 326-1 of the second chassis-based system to cause subsequent network traffic 328 directed to the VIP to be seamlessly received by primary member 326-1 of the second chassis-based system.

In an embodiment, the reverse proxy network security devices of HA (WAF) cluster 308 may be configured to be mounted within an equipment rack, where active members 330 may be associated with a first equipment rack and backup members 332 may be associated with a second equipment rack. Therefore, the multiple failure scenarios may include failure of the first equipment rack containing active members 330. When the failure scenario represents the failure of the first equipment rack, HA (WAF) cluster 308, like the chassis failure scenarios described above, a backup member, say 326-1 of backup members is selected to serve as the new primary member for the second equipment rack. Further, the second equipment rack may reconfigure backup members 332 to operate in the active mode. Also, HA (WAF) cluster 308 may associate the VIP with primary member 326-1 of the second equipment rack so that subsequent network traffic 328 directed to the VIP may be received by primary member 326-1 of the second equipment rack.

According to an aspect, an auto-scaling approach may be implemented in HA (WAF) cluster 308. To implement the auto scaling approach, each member of the multiple members may indicate ongoing availability by transmitting heartbeat messages to all other members, and active members, say 324-2, 324-3 and 324-2, other than primary member, say 324-1, include information regarding one or more traffic statistics relating to network traffic 328 they are processing or have processed within their heartbeat messages. The traffic statistics may include a number of active sessions, a measure of HTTP throughput, a measure of connections per unit of time (e.g., connections per second), and the like. Those skilled in the art will appreciate a variety of other traffic statistics and/or counters and device health related metrics may be used in combination with or in place of the specific traffic statistics identified herein. For example, device health related metrics, including, but not limited to, memory utilization and CPU utilization, may be used as indirect measures for throughput and sessions.

Primary member 324-1 may aggregate the traffic statistics extracted from the received heartbeat messages over a predetermined period of time. When a particular aggregated traffic statistic is greater than a corresponding predetermined auto scale up trigger threshold, primary member 324-1, may cause a backup member, say 326-1 of backup members 332 to become one of active members 330 by transmitting a first customized heartbeat message to backup member 326-1, which directs backup member 326-1 to enter the active mode. Conversely, when the aggregated traffic statistic is less than a predetermined auto scale down trigger threshold, primary member 324-1 may cause an active member, say 324-4 of active members 330 to exit active members 330 by transmitting a second customized heartbeat message to active member 324-4, which directs active member 324-4 to enter the backup mode.

FIGS. 4A-D are exemplary illustrations 400, 420, 430 and 440 representing configuration, synchronization and normal operation traffic processing in the context of a hybrid HA cluster of active devices and backup devices in accordance with an embodiment of the present invention.

According to an embodiment, representation 400 and 420 illustrate configuration of the members into active mode or backup mode. A network administrator 402 configures members 408-1 and 408-2 in active mode, collectively referred to as active members 404 and members 410-1 and 410-2 in backup mode, collectively referred to as backup members 406 or passive members 406. In an example, network administrator may perform the configuration indirectly via a graphical user interface (GUI) of a security management device that manages the members 408-1, 408-2, 410-1 and 410-2 or directly via a GUI of the individual members 408-1, 408-2, 410-1 and 410-2 as illustrated in representation 420. Further, the GUI may also allow network administrator 402 to define relative priorities of backup members and a maximum number of members that can operate in active mode.

In the example illustrated in representation 430, once the members 408-1, 408-2, 410-1 and 410-2 have been configured to be part of active members 404 and passive members 406, subsequent configuration changes by network administrator 430 may be made directly (e.g., through a GUI of the primary member) or indirectly (e.g., through a GUI of a security management device) via a master device or a primary member, in this case 408-1. Then, configuration information received by the primary member can be propagated to the other members of the hybrid HA cluster by the primary member by pushing the configuration to other members including active member 408-2 and backup members 406. In this manner, configuration changes can be made efficiently to the entire hybrid HA cluster.

Figure 4A:
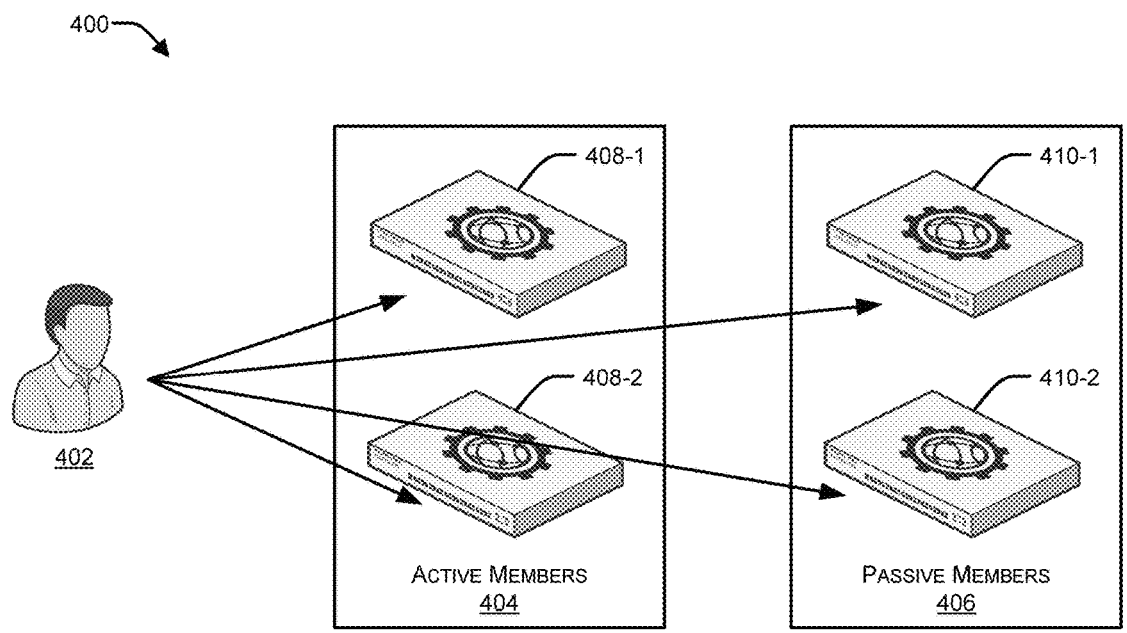
FIGS. 4A-D are exemplary illustrations representing configuration, synchronization and normal operation traffic processing in the context of a hybrid HA cluster of active devices and backup devices in accordance with an embodiment of the present invention.
Figure 4B:
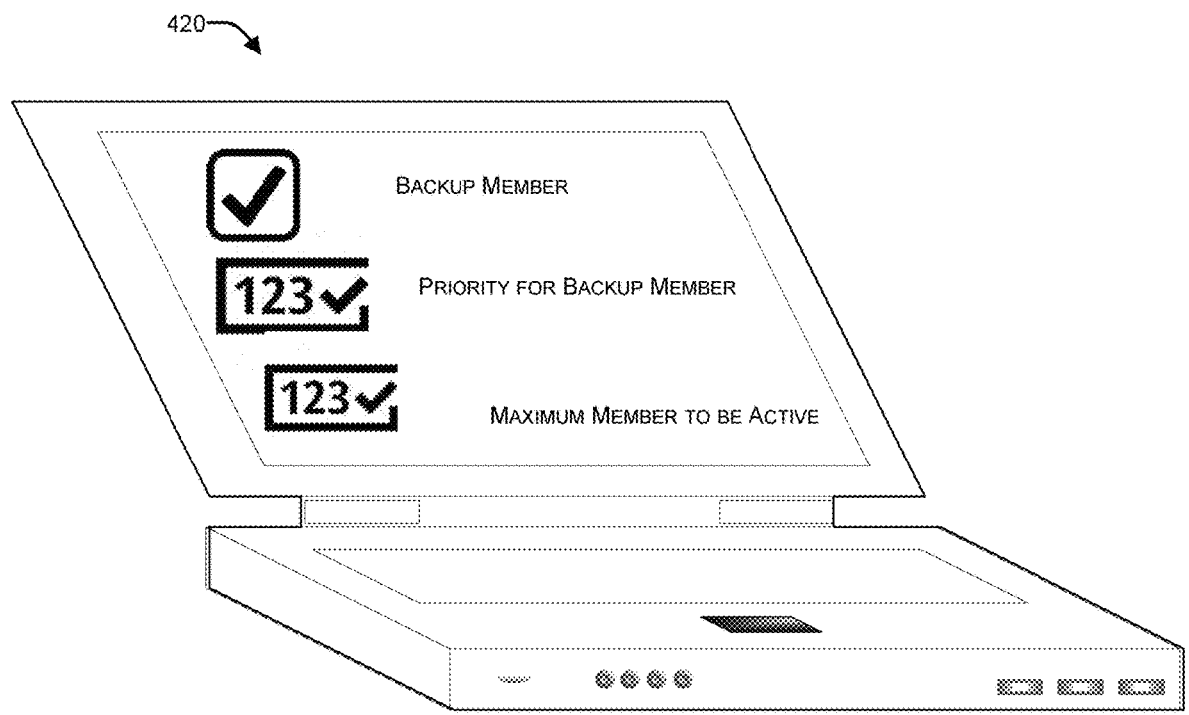
Figure 4C:
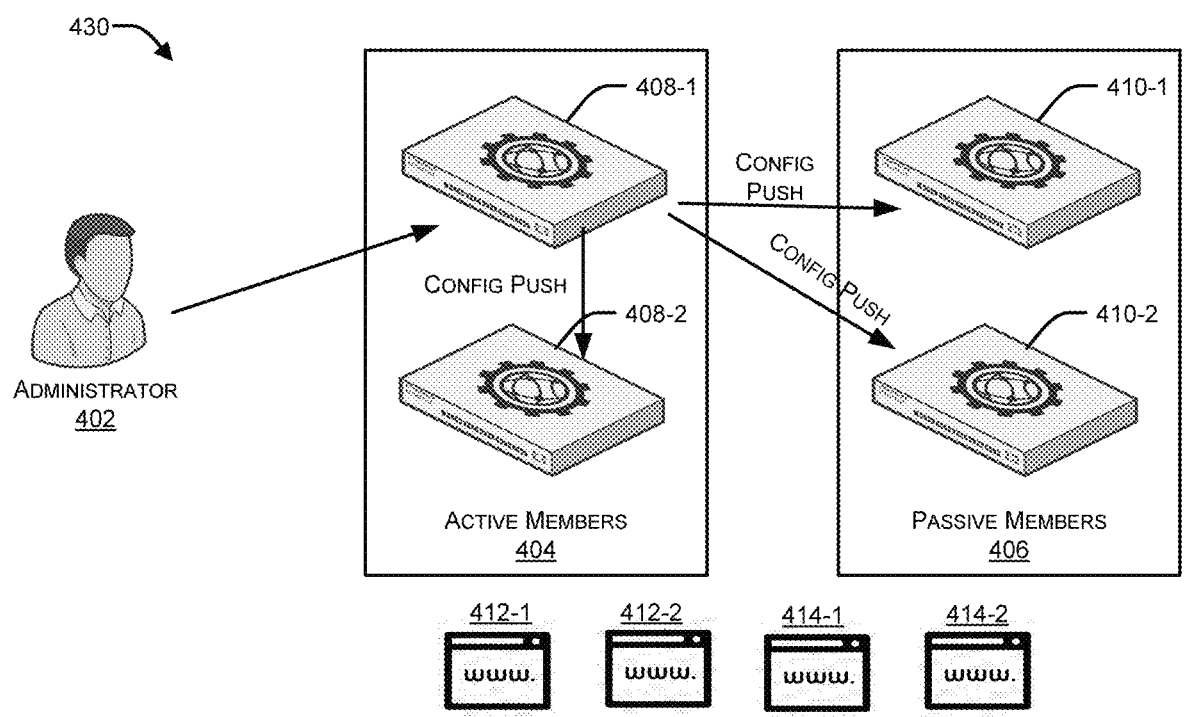
Figure 4D:
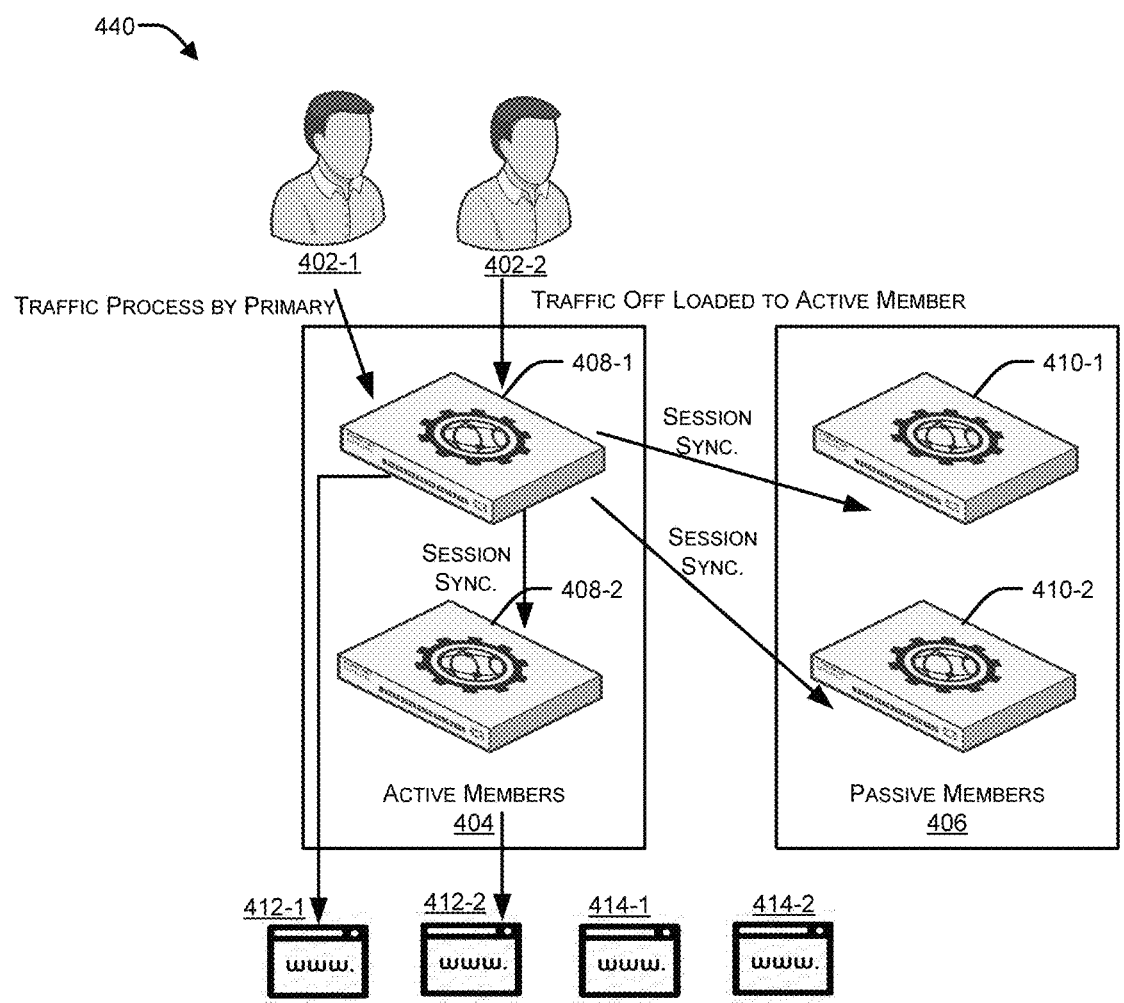

Turning now to FIG. 4D, normal operation traffic processing is illustrated in accordance with an embodiment of the present invention. In the context of the present example, representation 400 illustrates a hybrid HA cluster of reverse proxy network security devices 408-1, 408-2, 410-1, and 410-2 that have been configured as active members 404 (including member 408-1 and 408-2) and passive members (including member 410-1 and 410-2).

When network traffic from a client device (not shown) associated with end user 402-1 or 402-2 is directed to a VIP associated with the hybrid HA cluster, it is received by primary member 408-1 as a result of the VIP being assigned to primary member 408-1. According to an embodiment, primary member 408-1 performs security screening (e.g., web application filtering) on at least a portion of the received network traffic, say network session 412-1 and offloads remaining network traffic (e.g., network session 412-2) to one or more other of the active members (in this case, member 408-2). In order to maintain the readiness of passive members 406 to take over for a failure of one of the active members 404, session synchronization is performed to inform backup members 410-1 and 410-2 of the network sessions being processed by active members 408-1 and 408-2. Additionally, in order to facilitate failover from the primary member to member 408-2 should that become necessary, session synchronization is also performed from primary member 408-1 to member 408-2 to keep member 408-2 informed of network sessions being processed by primary member 408-1.

In addition, during normal operation, each active and passive member of the hybrid HA cluster periodically transmits heartbeat messages to all over members to, among other things, inform the other members of the originator's ongoing availability. In one embodiment, heartbeat messages are communicated via a different physical interface than the physical interface(s) through which network traffic to/from client devices and server devices is transmitted. Depending upon the particular implementation, session synchronization may piggy-back on the heartbeat messages or session information may be communicated via dedicated session synchronization messages. In one embodiment, session synchronization messages and heartbeat messages may use the same physical interfaces (e.g., separate from the physical interfaces on which network traffic is transmitted).

According to an embodiment, the hybrid HA cluster detects existence of a failure scenario by observing a lack of a heartbeat message during a predefined time period. The failure scenario may be due to any of (i) failure of primary member (e.g., 408-1 in the context of the present example) (iii) failure of a non-primary member of the active members (e.g., member 408-2 in the context of the present example) or (iii) a complete chassis or equipment rack failure on which active members 408-1 and 408-2 are running. Notably, the complete rack failure scenario is indicated by lack of a heartbeat message from all active members during the predefined time period. Responsive to detection of failure scenario #1 or #2 (above), the hybrid HA cluster, selects a backup member from among backup members 406 to join active members 404. Responsive to detection of failure scenario #3 (above), a complete failover from the chassis or equipment rack on which active members 404 reside to the chassis or equipment rack on which passive members 406 reside is performed, including selection of a new primary member from among passive members 406, placing all passive members 406 in the active mode and assigning the VIP (formerly associated with primary member 408-1) to the newly selected primary member. These failure scenarios are described further below with reference to FIGS. 5A, 5B and 5C.

Figure 5A:
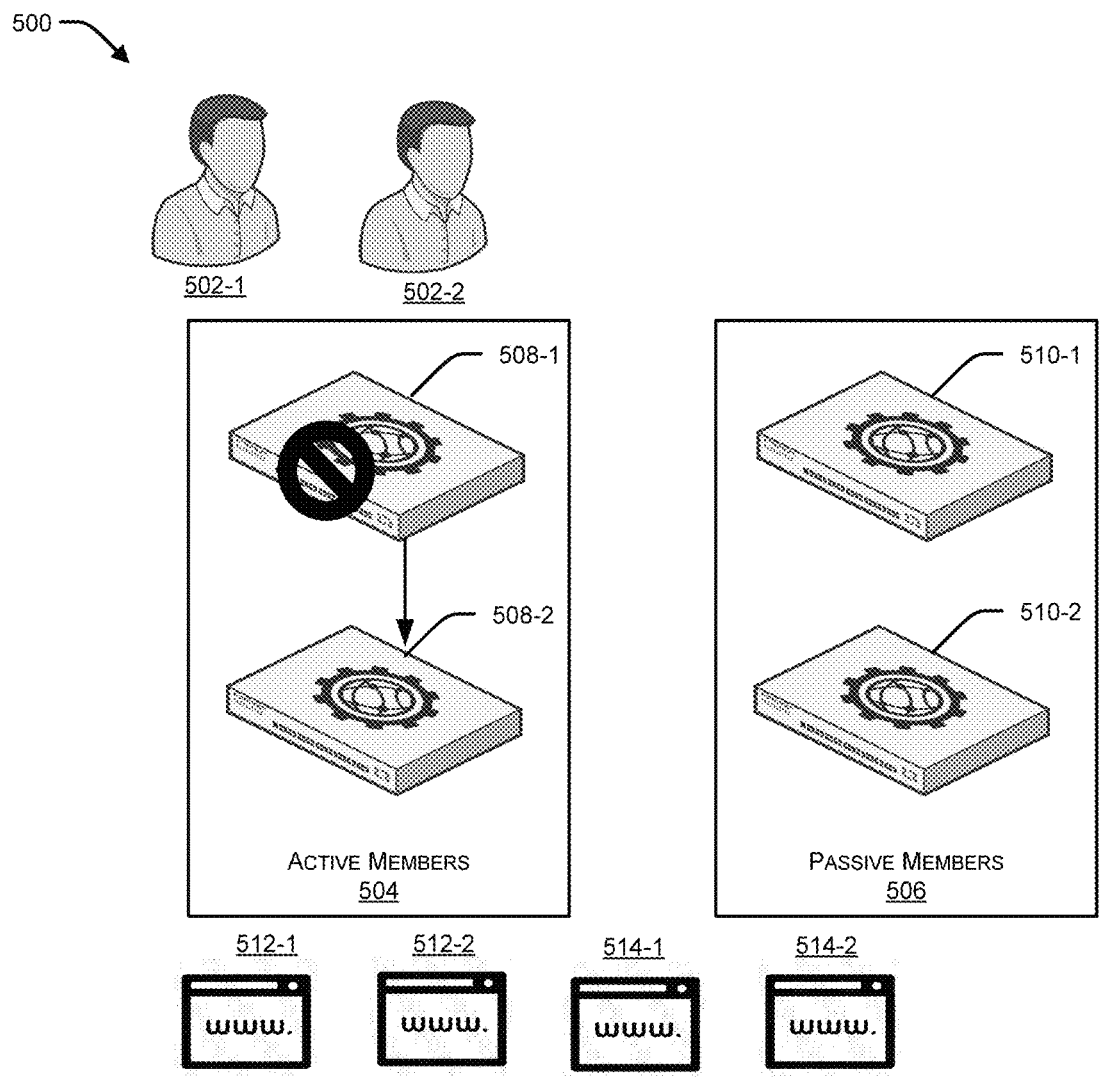
FIG. 5A illustrates an exemplary failover scenario in which a primary device fails in accordance with an embodiment of the present invention.

FIG. 5A illustrates an exemplary failover scenario 500 in which a primary member 508-1 of active members 504 of a hybrid HA cluster fails in accordance with an embodiment of the present invention. In the context of the present example, responsive to the hybrid HA cluster detecting a failure scenario representing a failure of primary member 508-1, the hybrid HA cluster selects a backup member from among passive members 506, say member 510-1, to join active members 504. Backup member 510-1 may be selected based on one or more of priority information assigned by the network administrator during configuration processing and MAC addresses of passive members 506. For example, the backup member with the lowest MAC address may be selected to become one of the active members 504. Further, the hybrid HA cluster may select a new primary member, say member 508-2 from a remaining set of active members 504. New primary member (in this case, member 508-2) may also be selected based on configured priority information and/or MAC addresses associated with the remaining set of active members 504. For example, the active member having the lowest MAC address may be selected as the new primary member. Furthermore, the hybrid HA cluster, may associate the VIP with new primary member 508-2 by reassigning the VIP from member 508-1 to member 508-2, so that subsequent network traffic directed to the VIP will be received by new primary member 508-2. In this manner, the hybrid HA cluster can seamlessly failover from a failed primary member to a new primary member selected from a set of remaining active members while also maintaining full processing capacity by having one of passive members 506 join the active members 504.

Figure 5B:
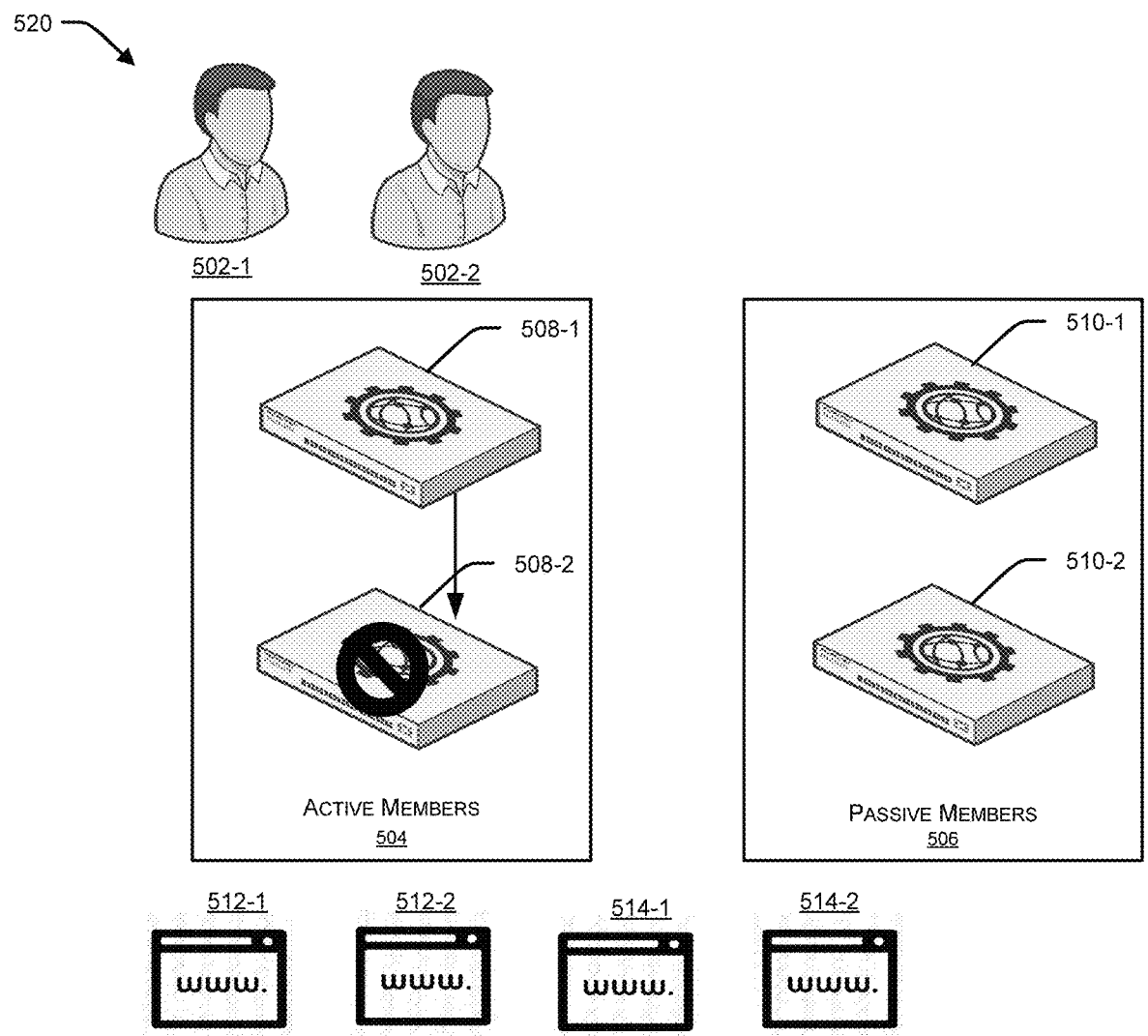
FIG. 5B illustrates an exemplary failover scenario in which an active device fails that is not the primary in accordance with an embodiment of the present invention.

FIG. 5B illustrates an exemplary failover scenario 520 in which an active member 508-2 of a hybrid HA cluster fails that is not the primary member in accordance with an embodiment of the present invention. In the context of the present example, responsive to the hybrid HA cluster detecting failure of a non-primary member, i.e., member 508-2 of active members 504, the hybrid HA cluster can cause one of the backup members, say member 510-1 to join active members 504 by placing backup member 510-1 in the active mode. Backup member 510-1 may be selected from among passive members 506 based on configured priority information and/or MAC addresses of passive members 506. For example, the backup member with the lowest MAC address may be selected to join the active members 504. In this manner, the hybrid HA cluster can seamlessly failover from a failed non-primary member to a new non-primary member selected from the passive members 506 to maintain full processing capacity by having the selected member of the passive members 560 join the active members 504 as a new non-primary member.

Figure 5C:
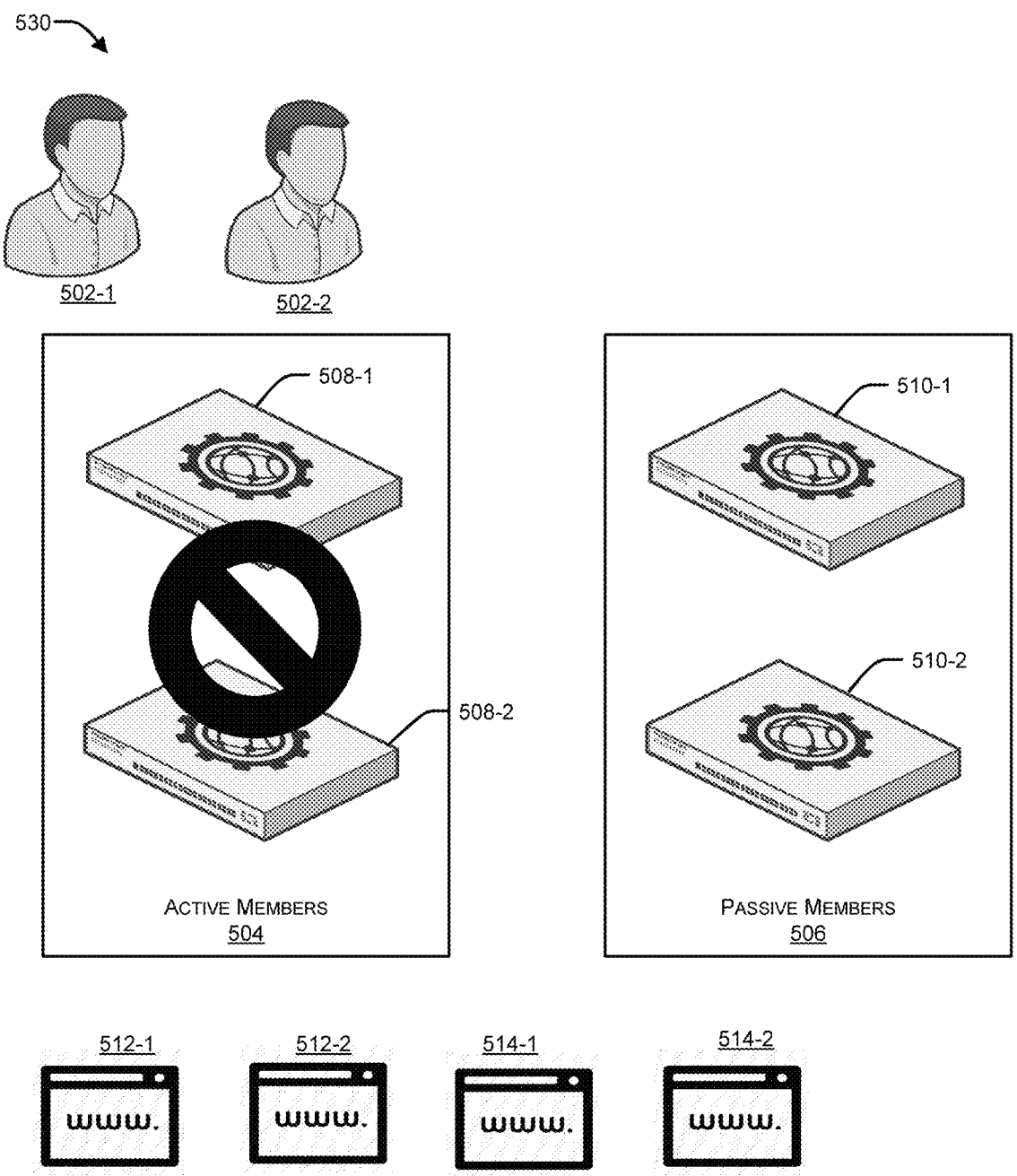
FIG. 5C illustrates an exemplary failover scenario in which there is a complete rack failure on which the active cluster is running in accordance with an embodiment of the present invention.

FIG. 5C illustrates an exemplary failover scenario 530 in which there is a complete chassis or equipment rack failure on which active members 504 of a hybrid HA cluster are running in accordance with an embodiment of the present invention. In an embodiment, the members of the hybrid HA cluster may be configured to be mounted within two different chassis or two different equipment racks. For example, active members 504 may be associated with a first chassis or equipment rack and the backup members may be associated with a second chassis or equipment rack.

In the context of the present example, it is assumed a complete chassis or equipment rack failure has occurred for the first chassis or equipment rack on which the active members 504 are running. In one embodiment, the hybrid HA cluster detects the existence of this failure scenario by, for example, observing by the passive members 506 receipt of no heartbeat messages from any of the active members 504 within a predetermined or configurable time period. Responsive to detecting the existence of a complete chassis or equipment rack failure, the hybrid HA cluster selects a backup member of the passive members 506, say member 510-1 to serve as the new primary member for the second chassis or equipment rack. Further, backup members 510-1 and 510-2 are configured to operate in the active mode to prepare them to begin actively processing network traffic. Further, the hybrid HA cluster may assign the VIP formerly associated with primary member 508-1 to the new primary member 510-1 of the second chassis or equipment rack to cause subsequent network traffic directed to the VIP to be received by the new primary member 510-1. In this manner, the hybrid HA cluster can seamlessly failover from a failed chassis or equipment rack to a backup chassis or equipment rack while maintaining full processing capacity by activating the passive members 506 and reassigning the VIP to a new primary member running on the backup chassis.

Figure 6A:
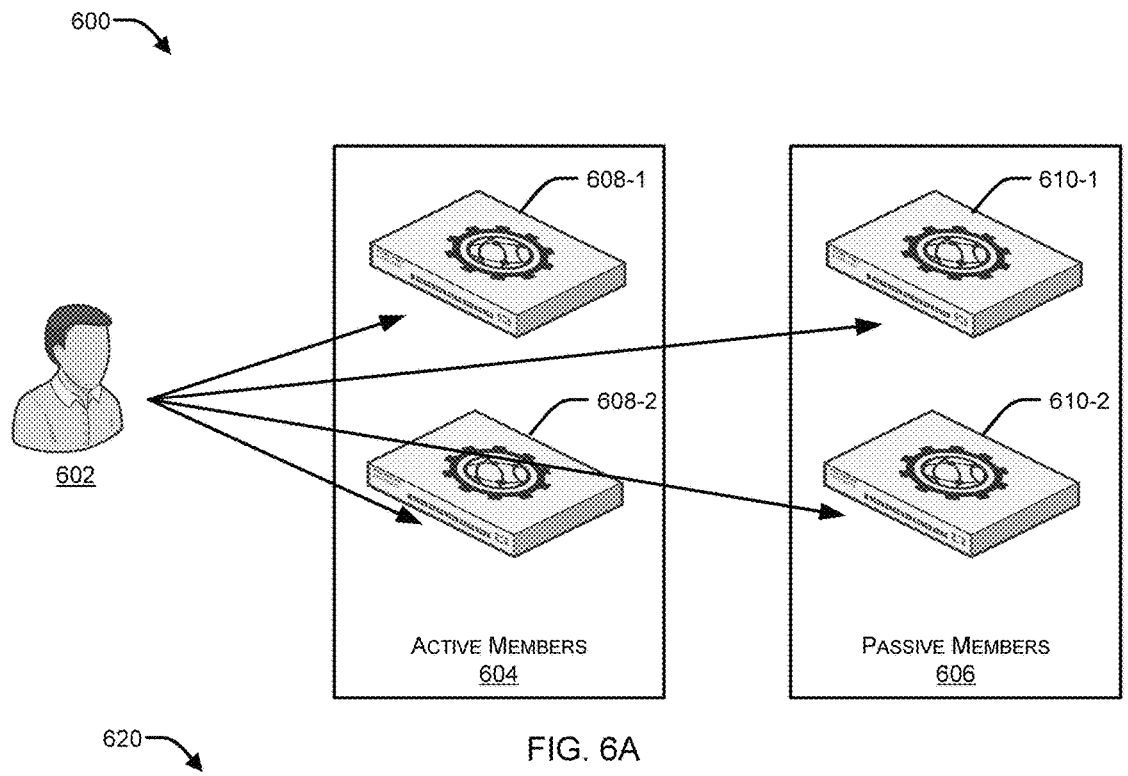
FIGS. 6A-B are exemplary illustrations representing configuration of a hybrid HA cluster to perform auto-scaling in accordance with an embodiment of the present invention.
Figure 6B:
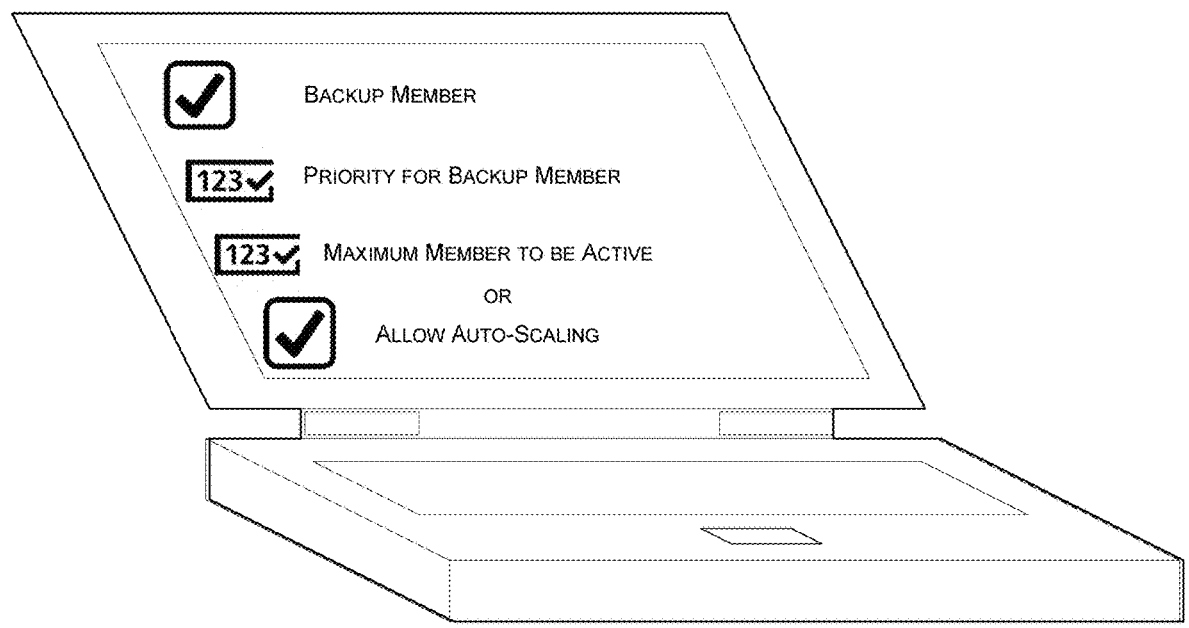

FIGS. 6A-B are exemplary illustrations representing configuration of a hybrid HA cluster to perform auto-scaling in accordance with an embodiment of the present invention. According to an embodiment, representation 600 and 620 illustrate configuration of members of a hybrid HA cluster into the active mode or the backup mode and enabling auto-scaling functionality. In one embodiment, auto scaling generally refers to the ability to adjust capacity to maintain steady, predictable performance with an optimal number of reverse proxy network security devices. As described above, network administrator 602 may configure members 608-1 and 608-2 in active mode, collectively referred to as active members 604 and members 610-1 and 610-2 in backup mode, collectively referred to as backup members 606 indirectly via a GUI (e.g., GUI 620) of a security management device or directly via a GUI (e.g., GUI 620) of the respective reverse proxy network security devices. In addition to configuring members 608-1, 608-2, 610-1 and 610-2 in active mode and passive mode, in the context of the present example, network administrator 620 also (i) specifies a priority for backup members, (ii) specifies a maximum number of members of the hybrid HA cluster that can be active at any point in time, and (iii) enables auto scaling functionality.

Figure 7A:
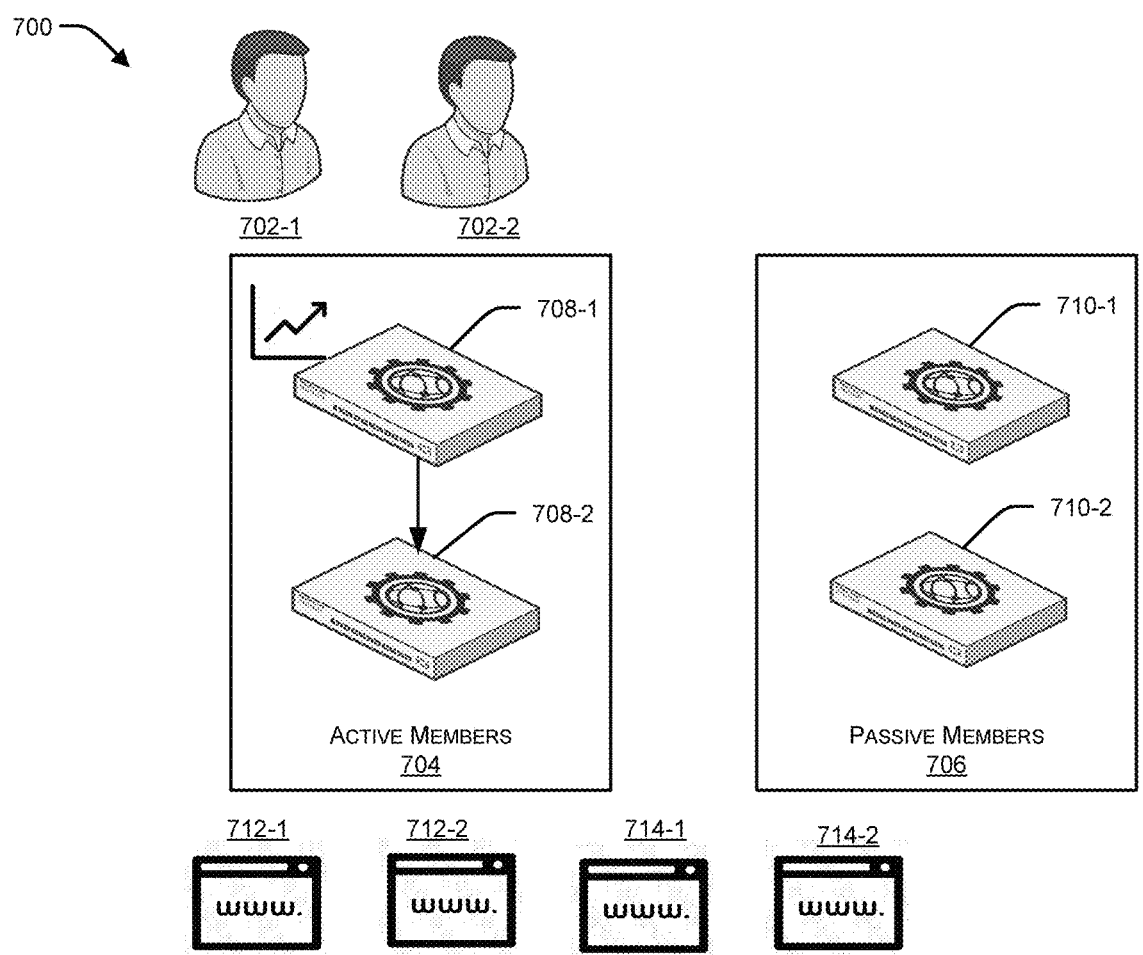
FIGS. 7A-C represent exemplary network traffic processing scenarios supported by an auto-scaling approach in accordance with an embodiment of the present invention.
Figure 7B:
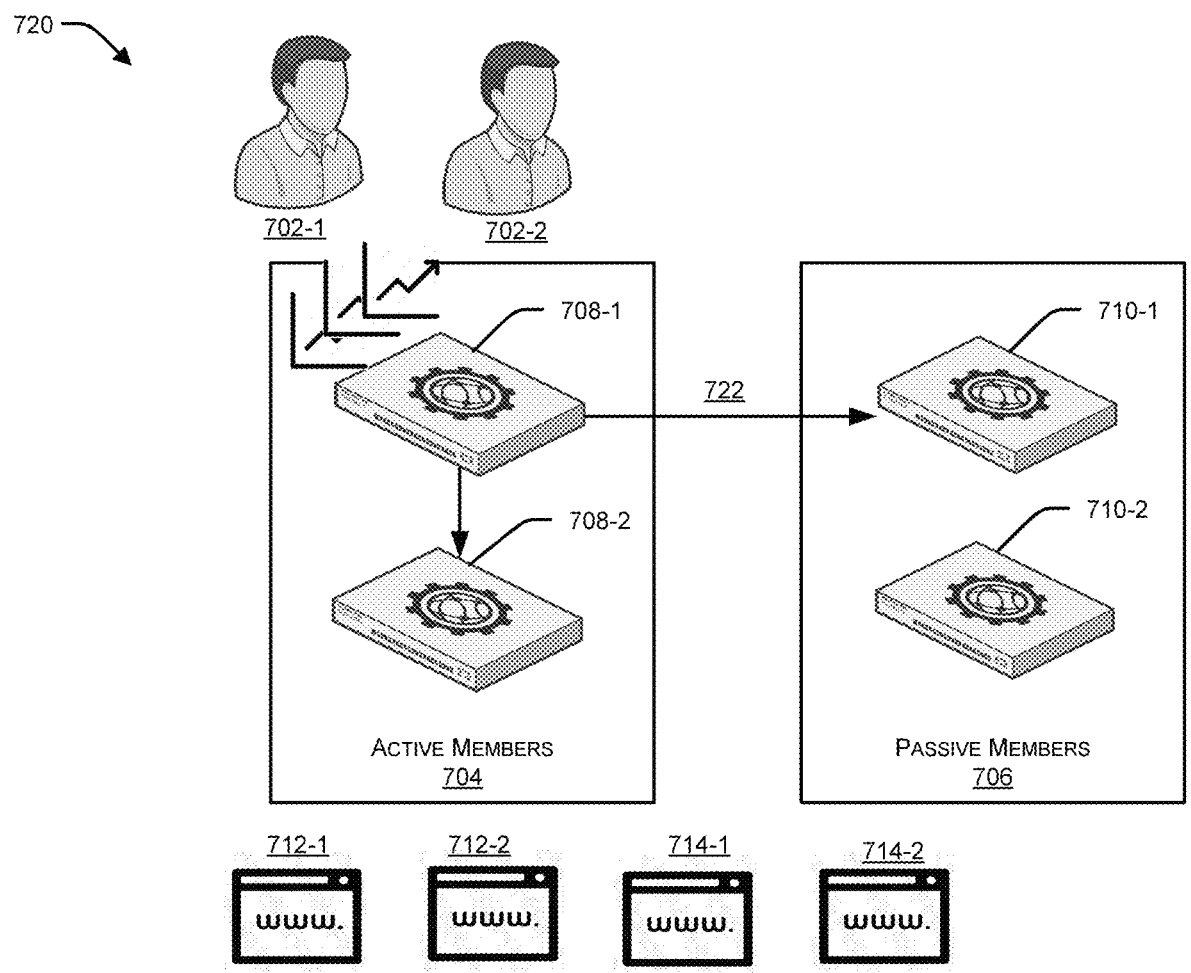
Figure 7C:
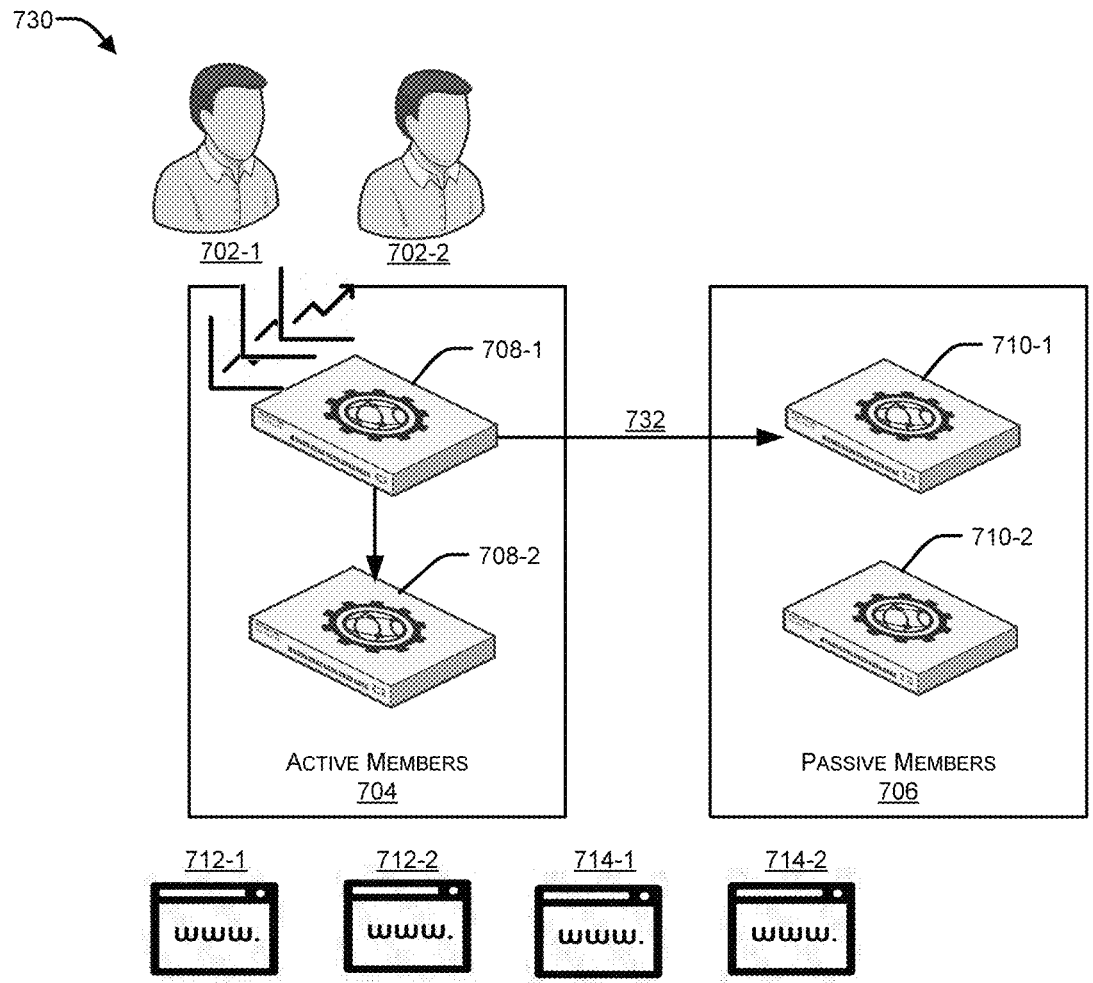

FIGS. 7A-C represent exemplary network traffic processing scenarios 700, 720, and 730 supported by an auto-scaling approach in accordance with an embodiment of the present invention. In the context of network traffic processing scenario 700, it is assumed that the individual members of the hybrid HA cluster of reverse proxy network security devices have been configured to operate in an active mode or in a backup mode based on received initial configuration settings received from the network administrator, for example. Further, it is assumed the network administrator has enabled auto scaling functionality for the hybrid HA cluster. As discussed above in the context of failover processing, each member of the hybrid HA cluster may indicate ongoing availability by transmitting heartbeat messages to all other members. Also, as above, a primary member, say 708-1 of active members 704 may receive and process network traffic received on a VIP assigned to primary member 708-1.

When network traffic from a client device (not shown) associated with end user 402-1 or 402-2 is directed to a VIP associated with the hybrid HA cluster, it is received by primary member 708-1 as a result of the VIP being assigned to primary member 708-1. According to an embodiment, primary member 708-1 performs security screening (e.g., web application filtering) on at least a portion of the received network traffic and offloads remaining network traffic to one or more other of the active members (in this case, member 708-2) based on an offloading algorithm.

In order for primary member 708-1 to evaluate whether to have one of the passive members 706 join the active members to assist with processing of network traffic, it is helpful for the primary member 708-1 to have some insight into one or more traffic statistics associated with network traffic that is currently being processed by the active members 704. Depending upon the particular implementation a single traffic statistic or multiple traffic statistics may be employed. For purposes of simplicity of explanation, various embodiments described herein may assume the use of a single traffic statistic to determine existence of an auto scale triggering condition, however, those skilled in the art will appreciate the ability to extend the specific examples provided herein to the use of multiple traffic statistics.

In one embodiment, information regarding the one or more traffic statistics is communicated by the active members 704 (other than the primary member 708-1) by incorporating such information within their respective heartbeat messages. Non-limiting examples of traffic statistics that may be communicated by the active members 704 to the primary member 708-1 via the heartbeat messages include a number of active sessions, a measure of HTTP throughput, and a measure of connections per unit of time (e.g., connections per second). For its part, primary member 708-1 may aggregate the received traffic statistics extracted from the heartbeat messages over a predetermined period of time, compare the aggregated statistics to one or more auto scale trigger conditions and/or policy sessions and based thereon (i) maintain the current number of active members, (ii) cause one of the passive members 706 to join the active members 704, or (iii) cause one of the active members 704 to exit the active members 704.

Network traffic processing scenario 700 represents a network traffic processing scenario in which the measured traffic statistic relating to network traffic being processed by the active members 704 is indicative of active members 704 having sufficient resources/capacity to handle the current level of network traffic. As such, based on the aggregated traffic statistics for the current time period, no action is taken by the primary member 708-1 and the number of active members 704 remains the same.

Network traffic processing scenario 720 represents a scenario in which the measured traffic statistic relating to network traffic being processed by the active members 704 is indicative of active members 704 having insufficient resources/capacity to continue to handle the current level of network traffic. As such, based on the aggregated traffic statistics and network administrator configured policy statistics, including, for example, a combination of any of one of more policy sessions, one or more auto scale up trigger thresholds and one or more auto scale down trigger thresholds, the primary member 708-1 makes a determination that one of the passive members 706 is to be directed to join the active members 704 to begin actively processing network traffic. For example, when the aggregated value of the measure traffic statistic is greater than a predetermined auto scale up trigger threshold, primary member 708-1 may cause a selected passive member, say member 710-1 to become one of the active members 704 by transmitting a first customized heartbeat message 722 to the selected passive member 710-1, which directs passive member 710-1 to enter the active mode and begin processing network traffic offloaded to it by primary member 708-1. The selection may be performed by the passive members 706 or the primary member 708-1 based on one or more of configured priority information and/or the MAC addresses of the passive members 706 as described above. In one embodiment, assuming an increase in network traffic that results in one or more subsequent determinations by primary member 708-1 regarding a need for additional active members 704, additional members of the passive members 706 may be directed to join the active members 704 subject to the configured maximum number of active members and subject also to the availability of a sufficient number of passive members 706.

Network traffic processing scenario 730 represents a scenario in which the measured traffic statistic relating to network traffic being processed by the active members 704 is indicative of active members 704 having an overabundance of resources/capacity relative to the current level of network traffic. As such, based on the aggregated traffic statistics and the network administrator configured policy statistics, the primary member 708-1 makes a determination that one of the active members 704 formerly part of the passive members 706 is to be directed to exit the active members 704 and to return to the passive members 706. For example, when the aggregated value of the measure traffic statistic falls below a predetermined auto scale down trigger threshold, primary member 708-1 may cause a selected active member, say member 710-1 to exit the active members 704 by transmitting a second customized heartbeat message 732 to the selected active member 710-1, which directs the selected active member 710-1 to return to the backup mode.

Figure 8:
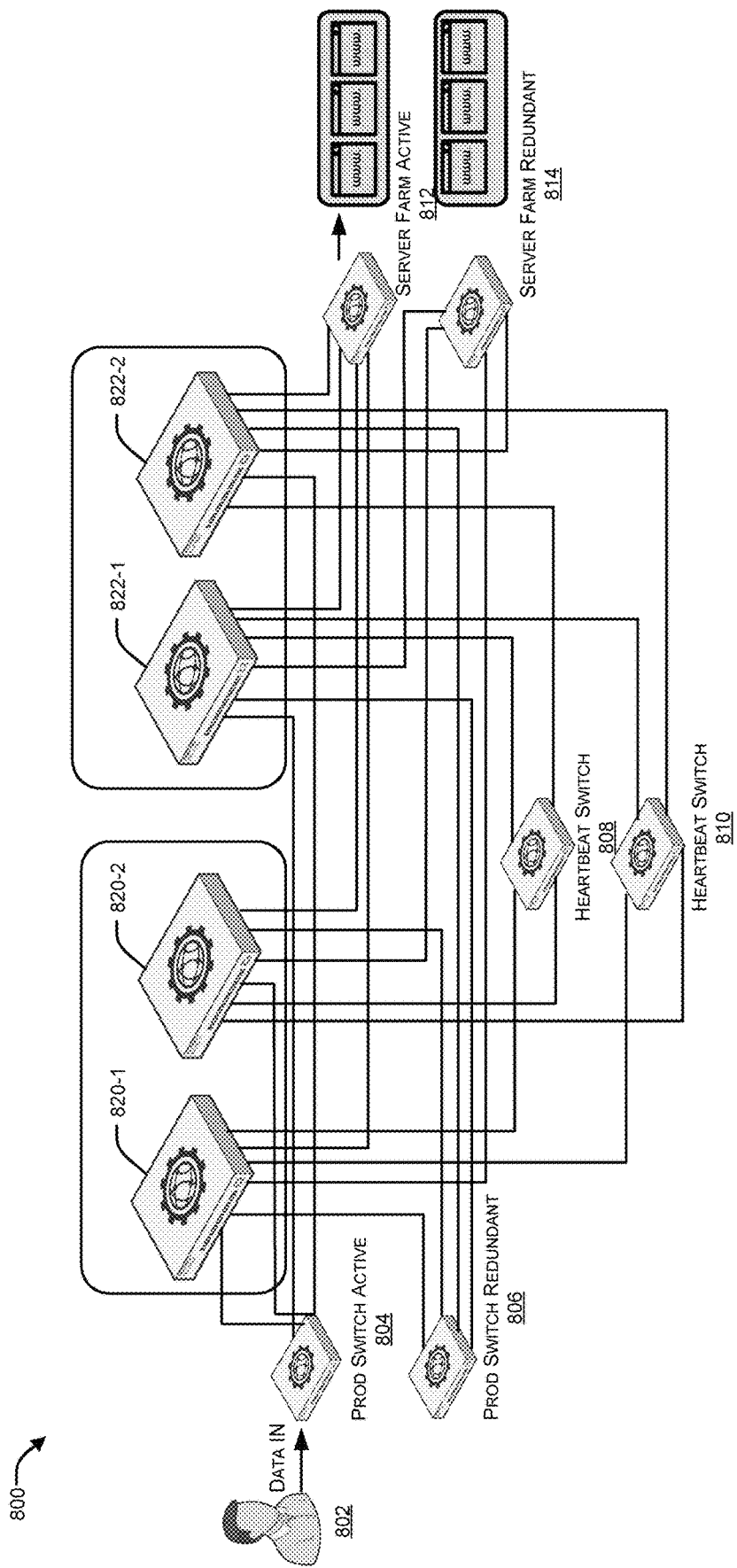
FIG. 8 is an exemplary representation of an implementation of an HA architecture in accordance with an embodiment of the present invention.

FIG. 8 is a block diagram 800 illustrating of an implementation of an HA architecture in accordance with an embodiment of the present invention.

In the context of the present example, active members 820-1 and 820-2 and backup members 822-1 and 822-2 of a hybrid HA cluster may be configured by a network administrator 802. The hybrid HA cluster may be sandwiched between a server farm switch (that may include server farm active component 812 and server farm redundant component 814) and production switch (that may include production switch active component 804 and production switch redundant component 806). Network administrator 802 may also configure an active interface that connects to active switches 804 and 812, and a redundant interface that connects to redundant switches 806 and 814. In an example, active production switch 804 as well as active server farm switch 812 may use a 10G interface. Heartbeat switches 808 and 810 may be used to convey session synchronization messages and heartbeat messages to active members 820-1 and 820-2 and backup members 822-1 and 822-1 of the hybrid HA cluster, respectively. In an example, heartbeat switches 808 and 810 may use separate 1G interfaces. Also, in a similar manner, server farm active component 812 may be synchronized with server farm redundant component 814, and production switch active component 804 may be synchronized with production switch redundant component 806.

As noted above, a CSP may desire to maintain full processing capacity of a predetermined or configurable number of reverse proxy network security devices at all times. In an example, in the hybrid HA cluster, an aggregate throughput requirement through active members 820-1 and 820-2 may be equal to 20 Gbps. In case of failure of any or a combination of a primary or master member 820-1 and a non-primary active member 820-2, the aggregate throughput may drop down to 10 Gbps, which may trigger a failover to one or a combination of backup members 822-1 or 822-2. The failover may be performed in accordance with the failure scenarios described above with reference to FIGS. 5A-C, so that aggregate throughput of 20 Gbps may be provided seamlessly. Further, in a similar manner if active production switch 804 fails, the traffic can flow through redundant production switch 806 and if active server farm switch 812 fails, the traffic can flow through redundant server farm switch 806.

Figure 9A:
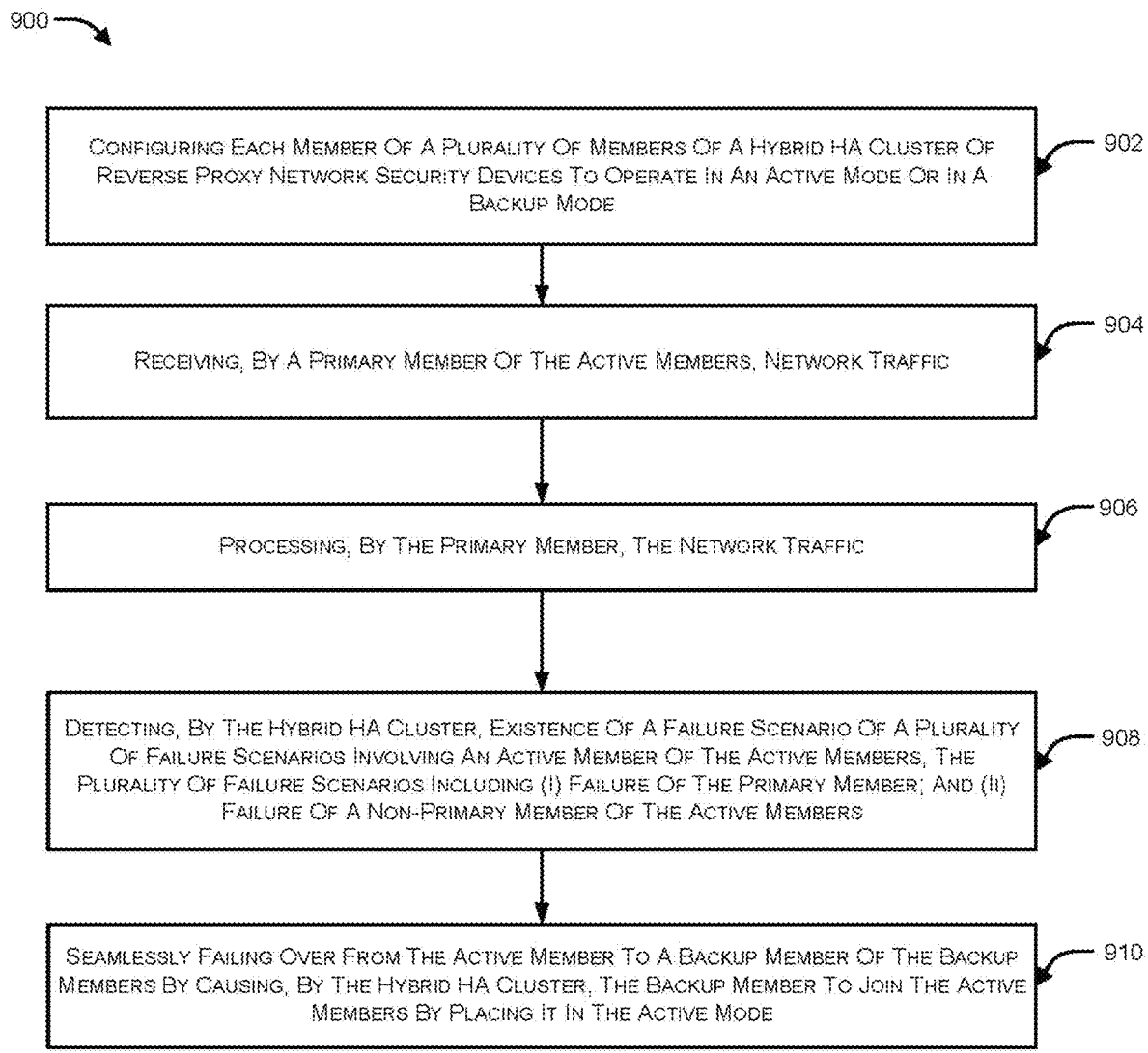
FIG. 9A is a flow diagram illustrating a process for performing failover in a hybrid high-availability (HA) cluster in accordance with an embodiment of the present invention.

FIG. 9A is a flow diagram 900 illustrating a process for performing failover in a hybrid high-availability (HA) cluster in accordance with an embodiment of the present invention. In the context of the present example, a method of performing failover in a hybrid HA cluster is disclosed. The method is initiated at block 902, where each member, of multiple members of a hybrid HA cluster of reverse proxy network security devices, is configured to operate in an active mode or in a backup mode. During the configuration, at least two members of the multiple members are configured to operate in the active mode ("active members"), and at least two members of the multiple members are configured to operate in the backup mode ("backup members").

At block 904, a primary member of the active members receives network traffic and at block 906, the primary member processes the network traffic. Further, at block 908, the hybrid HA cluster detects existence of a failure scenario of multiple potential failure scenarios involving an active member. The multiple potential failure scenarios may include failure of the primary member and failure of a non-primary member of the active members. In response to detection of the failure scenario, at block 910, the hybrid HA cluster causes one of the backup members to join the active members by placing it in the active mode to seamlessly fail over from the active member to the backup member.

Figure 9B:
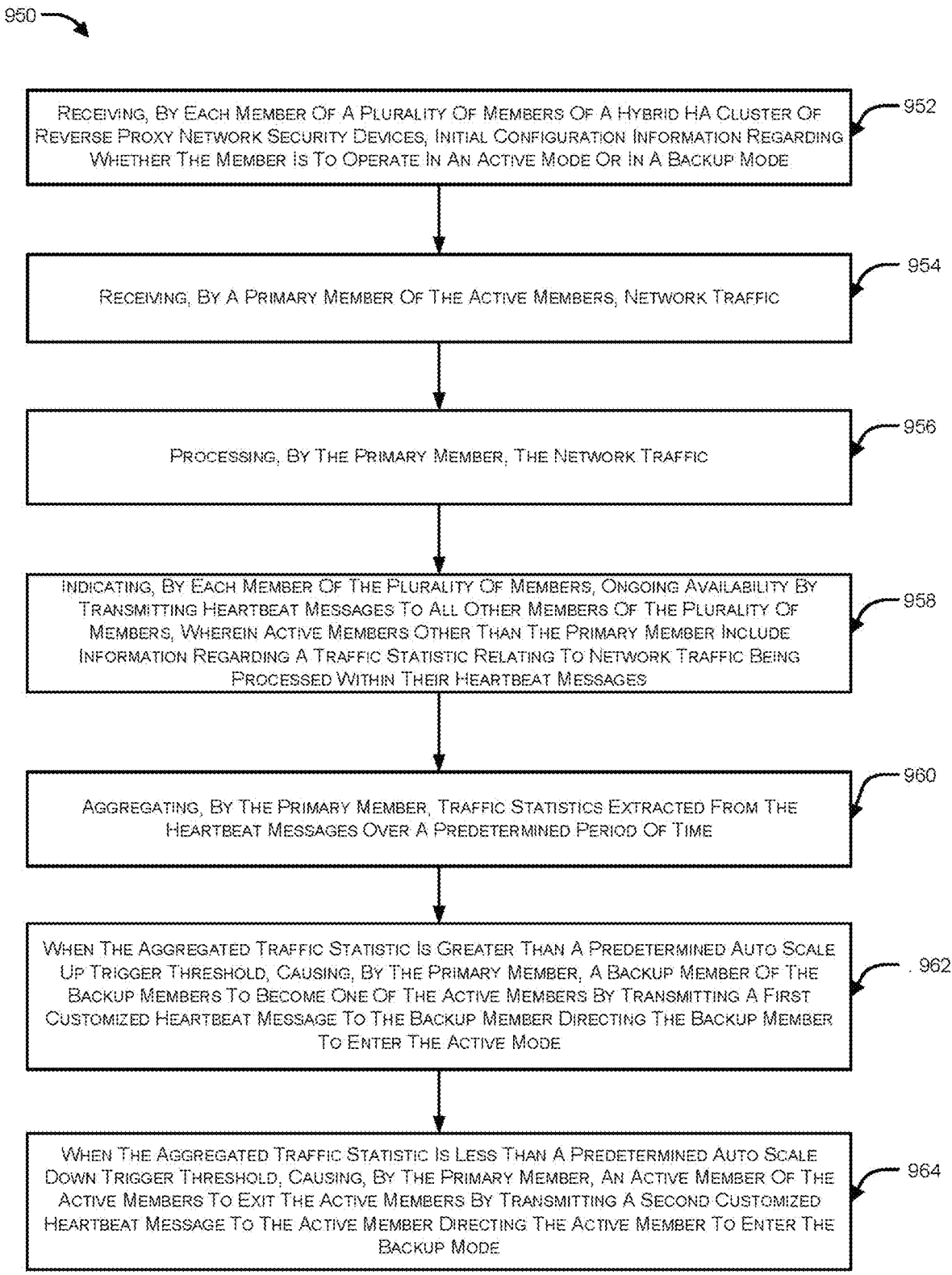
FIG. 9B is a flow diagram illustrating a process for performing auto scaling in a hybrid high-availability (HA) cluster in accordance with an embodiment of the present invention.

FIG. 9B is a flow diagram 950 illustrating a process for performing auto scaling in a hybrid high-availability (HA) cluster in accordance with an embodiment of the present invention. In the context of the present example, a method of performing auto scaling in a hybrid HA cluster is disclosed. The method is initiated at block 952, where each member multiple members of a hybrid HA cluster of reverse proxy network security devices, receives initial configuration information regarding whether the member is to operate in an active mode or in a backup mode. According to the configuration, at least two members of the multiple members are configured to operate in the active mode ("active members"), and at least two members of the plurality of members are configured to operate in the backup mode ("backup members").

At block 954, a primary member of the active members receives network traffic and at block 956, the primary member processes the network traffic. At block 958, each member of the multiple of members indicates its ongoing availability by transmitting heartbeat messages to all other members of the hybrid HA cluster. Active members other than the primary member include information regarding a traffic statistic relating to network traffic being processed within their heartbeat messages. At block 960, the primary member aggregates traffic statistics extracted from the heartbeat messages over a predetermined period of time. At block 962, when the aggregated traffic statistic is greater than a predetermined auto scale up trigger threshold, the primary member causes a backup member of the backup members to become one of the active members by transmitting a first customized heartbeat message to the backup member directing the backup member to enter the active mode. Conversely, at block 964, when the aggregated traffic statistic is less than a predetermined auto scale down trigger threshold, the primary member causes an active member of the active members to exit the active members by transmitting a second customized heartbeat message to the active member directing the active member to enter the backup mode.

Figure 10:
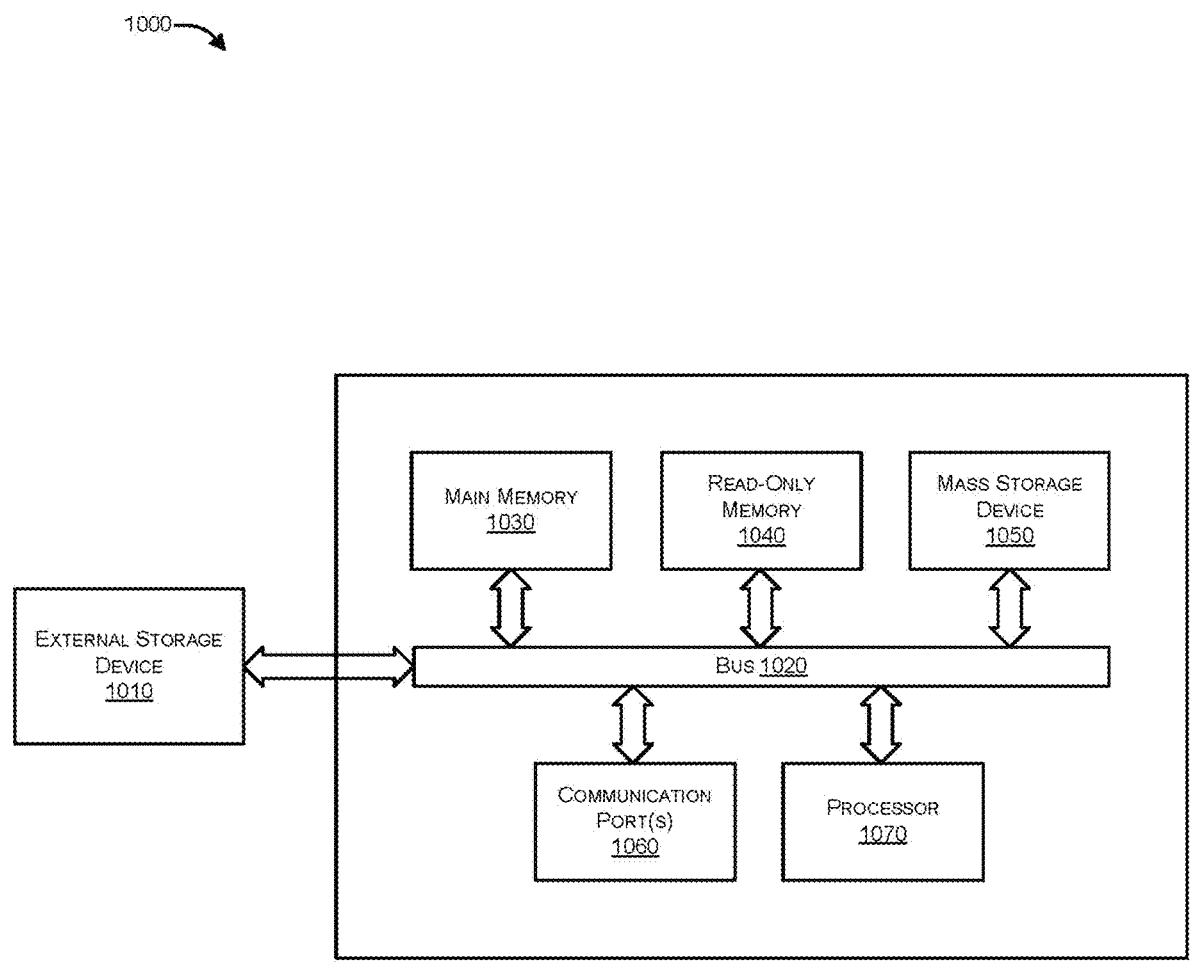
FIG. 10 illustrates an exemplary computer system in which or with which embodiments of the present invention may be utilized.

FIG. 10 illustrates an exemplary computer system 1000 in which or with which embodiments of the present invention may be utilized. Computer system 1000 may represent an active or a passive reverse proxy network security device (e.g., one of active members 330, 404, 504, 604, and 704 or passive members 332, 406, 506, 606, and 706) that is a member of a hybrid HA cluster (e.g., HA web application firewall (WAF) cluster 308). As shown in FIG. 10, computer system 1000 includes an external storage device 1010, a bus 1020, a main memory 1030, a read only memory 1040, a mass storage device 1050, a communication port 1060, and a processor 1070.

Those skilled in the art will appreciate that computer system 1000 may include more than one processor 1070 and communication ports 1060. Examples of processor 1070 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 1070 may include various modules associated with embodiments of the present invention.

Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g. start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1060. External storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Furthermore, while in the context of various embodiment described herein, an improved hybrid HA cluster architecture and associated failover processing and auto scale functionality is described with reference to a hybrid HA cluster of web application firewall devices, those skilled in the art will appreciate that the techniques described herein are also applicable to load balancers, reverse proxies and other network security devices that operate in a manner similar to a reverse proxy (e.g., accepts a request from a client, forwards it to a server that can fulfill it, and returns the server's response to the client).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method of performing failover in a high-availability (HA) cluster comprising:
 configuring each member of a plurality of members of a hybrid HA cluster of reverse proxy network security devices to operate in an active mode or in a backup mode, wherein at least two members of the plurality of members are configured to operate in the active mode ("active members"), and wherein at least two members of the plurality of members are configured to operate in the backup mode ("backup members");
 receiving, by a primary member of the active members, network traffic;
 processing, by the primary member, the network traffic;
 detecting, by the hybrid HA cluster, existence of a failure scenario of a plurality of failure scenarios involving an active member of the active members, the plurality of failure scenarios including (i) failure of the primary member and (ii) failure of a non-primary member of the active members; and
 seamlessly failing over from the active member to a backup member of the backup members by causing, by the hybrid HA cluster, the backup member to join the active members by placing it in the active mode,
 wherein the reverse proxy network security devices comprise web application firewalls, wherein the network traffic comprises HyperText Transfer Protocol (HTTP) traffic to or from a web application and wherein said performing, by the primary member, the security screening on at least part of the network traffic comprises filtering, monitoring or blocking the HTTP traffic, and
 wherein the reverse proxy network security devices are each implemented in a form of a blade configured to be installed within a chassis-based system, wherein the active members are associated with a first chassis-based system and wherein the backup members are associated with a second chassis-based system and wherein the plurality of failure scenarios further includes failure of the first chassis-based system.

2. The method of claim 1, wherein said processing, by the primary member, the network traffic comprises:
 performing, by the primary member, security screening on at least part of the network traffic;
 offloading, by the primary member, a remaining portion of the network traffic to one or more other members of the active members; and
 performing, by the primary member, session synchronization by communicating session information associated with the network traffic with all other active members and the backup members.

3. The method of claim 1, further comprising:
 indicating, by each member of the plurality of members, ongoing availability by transmitting heartbeat messages to all other members of the plurality of members; and
 wherein said detecting, by the hybrid HA cluster, existence of a failure scenario of a plurality of failure scenarios involving an active member of the active members is based on observing a lack of a heartbeat message during a predefined time period.

4. The method of claim 1, wherein the network traffic is directed to a virtual Internet Protocol address (VIP) and wherein said seamlessly failing over from the active member to a backup member further comprises:
 selecting, by the hybrid HA cluster, the backup member from among the backup members to become one of the active members;
 when the failure scenario represents the failure of the primary member:
  selecting, by the hybrid HA cluster, from a remaining set of active members a new primary member that will serve as the primary member; and
  causing, by the hybrid HA cluster, subsequent network traffic directed to the VIP to be received by the selected new primary member by associating the VIP with the selected new primary member.

5. The method of claim 4, wherein said selecting, by the hybrid HA cluster, the backup member from among the backup members to become one of the active members comprises selecting the backup member based at least in part on a media access control (MAC) address of the backup member.

6. The method of claim 4, wherein said selecting, by the hybrid HA cluster, from a remaining set of active members a new primary member that will serve as the primary member comprises selecting an active member of the remaining set of active members based at least in part on a MAC address of the active member.

7. The method of claim 1, wherein when the failure scenario represents the failure of the first chassis-based system:
 selecting, by the hybrid HA cluster, a backup member of the backup members that will serve as a primary member for the second chassis-based system;
 reconfiguring, by the second chassis-based system, the backup members to operate in the active mode; and
 causing, by the hybrid HA cluster, subsequent network traffic directed to the VIP to be received by the primary member of the second chassis-based system by associating the VIP with the primary member of the second chassis-based system.

8. The method of claim 1, wherein the reverse proxy network security devices are each configured to be mounted within an equipment rack, wherein the active members are associated with a first equipment rack and wherein the backup members are associated with a second equipment rack and wherein the plurality of failure scenarios further includes failure of the first equipment rack.

9. The method of claim 8, wherein when the failure scenario represents the failure of the first equipment rack:
 selecting, by the hybrid HA cluster, a backup member of the backup members that will serve as a primary member for the second equipment rack;
 reconfiguring, by the second equipment rack, the backup members to operate in the active mode; and
 causing, by the hybrid HA cluster, subsequent network traffic directed to the VIP to be received by the primary member of the second equipment rack by associating the VIP with the primary member of the second equipment rack.

10. A non-transitory computer-readable medium storing source code that, when executed by a processor, performs a method of performing auto scaling in a high-availability (HA) cluster, the method comprising:
 receiving, by each member of a plurality of members of a hybrid HA cluster of reverse proxy network security devices, initial configuration information regarding whether the member is to operate in an active mode or in a backup mode, wherein at least two members of the plurality of members are configured to operate in the active mode ("active members"), and wherein at least two members of the plurality of members are configured to operate in the backup mode ("backup members");

receiving, by a primary member of the active members, network traffic;

processing, by the primary member, the network traffic;

indicating, by each member of the plurality of members, ongoing availability by transmitting heartbeat messages to all other members of the plurality of members, wherein active members other than the primary member include information regarding a traffic statistic relating to network traffic being processed within their heartbeat messages;

aggregating, by the primary member, traffic statistics extracted from the heartbeat messages over a predetermined period of time;

when the aggregated traffic statistic is greater than a predetermined auto scale up trigger threshold, causing, by the primary member, a backup member of the backup members to become one of the active members by transmitting a first customized heartbeat message to the backup member directing the backup member to enter the active mode; and when the aggregated traffic statistic is less than a predetermined auto scale down trigger threshold, causing, by the primary member, an active member of the active members to exit the active members by transmitting a second customized heartbeat message to the active member directing the active member to enter the backup mode.

11. The method of claim 10, wherein the reverse proxy network security devices comprise web application firewalls, wherein the network traffic comprises HyperText Transport Protocol (HTTP) traffic to or from a web application and wherein said performing, by the primary member, the security screening on at least part of the network traffic comprises filtering, monitoring or blocking the HTTP traffic.

12. The method of claim 11, wherein the reverse proxy network security devices are each implemented in a form of a blade configured to be installed within a chassis-based system, wherein the active members are associated with a first chassis-based system and wherein the backup members are associated with a second chassis-based system.

13. The method of claim 11, wherein the reverse proxy network security devices are each configured to be mounted within an equipment rack, wherein the active members are associated with a first equipment rack and wherein the backup members are associated with a second equipment rack.

14. The method of claim 10, wherein the backup member is selected by the primary member based at least in part on a media access control (MAC) address of the backup member.

15. The method of claim 10, wherein the active member is selected by the primary member based at least in part on a MAC address of the active member.

16. The method of claim 10, wherein the traffic statistic comprises one or more of a number of sessions, HyperText Transfer Protocol (HTTP) throughput, and a measure of connections per unit of time.

17. A hardware system for performing failover in a high-availability (HA) cluster, the system comprising:
a plurality of members of a hybrid HA cluster of reverse proxy network security devices to operate in an active mode or in a backup mode, wherein at least two members of the plurality of members are configured to operate in the active mode ("active members"), and wherein at least two members of the plurality of members are configured to operate in the backup mode ("backup members"); and a primary member of the active members to receive and process network traffic, wherein the hybrid HA cluster detects existence of a failure scenario of a plurality of failure scenarios involving an active member of the active members, the plurality of failure scenarios including (i) failure of the primary member and (ii) failure of a non-primary member of the active members, and seamlessly fails over from the active member to a backup member of the backup members by causing, by the hybrid HA cluster, the backup member to join the active members by placing it in the active mode, wherein the reverse proxy network security devices comprise web application firewalls, wherein the network traffic comprises HyperText Transfer Protocol (HTTP) traffic to or from a web application and wherein said performing, by the primary member, the security screening on at least part of the network traffic comprises filtering, monitoring or blocking the HTTP traffic, and wherein the reverse proxy network security devices are each implemented in a form of a blade configured to be installed within a chassis-based system, wherein the active members are associated with a first chassis-based system and wherein the backup members are associated with a second chassis-based system and wherein the plurality of failure scenarios further includes failure of the first chassis-based system.

\* \* \* \* \*